US011045761B2

United States Patent
Kasahara et al.

(10) Patent No.: US 11,045,761 B2
(45) Date of Patent: Jun. 29, 2021

(54) SEPARATION MEMBRANE SHEET, SEPARATION MEMBRANE ELEMENT, SEPARATION MEMBRANE MODULE, AND MANUFACTURING METHOD FOR SEPARATION MEMBRANE SHEET

(71) Applicant: SUMITOMO CHEMICAL COMPANY, LIMITED, Tokyo (JP)

(72) Inventors: Shohei Kasahara, Osaka (JP); Kosuke Makiguchi, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/643,228

(22) PCT Filed: Aug. 13, 2019

(86) PCT No.: PCT/JP2019/031801
§ 371 (c)(1),
(2) Date: Feb. 28, 2020

(87) PCT Pub. No.: WO2020/045074
PCT Pub. Date: Mar. 5, 2020

(65) Prior Publication Data
US 2020/0406184 A1 Dec. 31, 2020

(30) Foreign Application Priority Data
Aug. 31, 2018 (JP) .............................. JP2018-162868

(51) Int. Cl.
| | | |
|---|---|---|
| *B01D 53/22* | (2006.01) | |
| *B01D 63/10* | (2006.01) | |
| *B01D 67/00* | (2006.01) | |
| *B01D 69/02* | (2006.01) | |
| *B01D 69/10* | (2006.01) | |
| *B01D 69/12* | (2006.01) | |
| *B01D 71/40* | (2006.01) | |
| *B01D 71/82* | (2006.01) | |
| *C01B 3/50* | (2006.01) | |

(52) U.S. Cl.
CPC .......... *B01D 53/228* (2013.01); *B01D 63/10* (2013.01); *B01D 67/009* (2013.01); *B01D 69/02* (2013.01); *B01D 69/10* (2013.01); *B01D 69/12* (2013.01); *B01D 71/40* (2013.01); *B01D 71/82* (2013.01); *C01B 3/503* (2013.01); *B01D 2325/20* (2013.01); *B01D 2325/42* (2013.01); *C01B 2203/0405* (2013.01); *C01B 2203/0475* (2013.01)

(58) Field of Classification Search
CPC ...... B01D 53/228; B01D 63/10; B01D 69/02; B01D 69/10; B01D 69/12; B01D 71/40; B01D 71/82; B01D 67/009; B01D 2325/20; B01D 2325/42; C01B 3/503; C01B 2203/0475; C01B 2203/0406
USPC .......................................................... 524/27
See application file for complete search history.

(56) References Cited

U.S. PATENT DOCUMENTS

| | | | |
|---|---|---|---|
| 5,445,669 | A | 8/1995 | Nakabayashi et al. |
| 2005/0159571 | A1 | 7/2005 | Hamamoto et al. |
| 2008/0214687 | A1* | 9/2008 | Muller ................... B01D 71/32 521/54 |
| 2014/0137740 | A1 | 5/2014 | Aburaya et al. |
| 2017/0232398 | A1 | 8/2017 | Ota et al. |
| 2019/0111382 | A1* | 4/2019 | Liang ................... B01D 53/22 |

FOREIGN PATENT DOCUMENTS

| | | |
|---|---|---|
| EP | 0 629 411 A1 | 12/1994 |
| JP | H07-88171 A | 4/1995 |
| JP | 07275672 A * | 10/1995 |
| JP | H07-275672 A | 10/1995 |
| JP | H07-102310 B2 | 11/1995 |
| JP | H10-57787 A | 3/1998 |
| JP | 2879057 B2 | 4/1999 |
| JP | 2003-251163 A | 9/2003 |
| JP | 2003-268009 A | 9/2003 |
| JP | 2008-543546 A | 12/2008 |
| JP | 2013-027841 A | 2/2013 |
| JP | 2018-130662 A | 8/2018 |
| WO | WO-2006/135966 A1 | 12/2006 |
| WO | WO-2016/024523 A1 | 2/2016 |
| WO | WO-2017/175656 A1 | 10/2017 |
| WO | WO-2017175656 A1 * | 10/2017 ............. B01D 69/00 |
| WO | WO-2018150827 A1 * | 8/2018 ........... B01D 65/006 |

OTHER PUBLICATIONS

International Searching Authority, "International Search Report," issued in connection with International Patent Application No. PCT/JP2019/031801, dated Sep. 24, 2019.
International Searching Authority, "Written Opinion," issued in connection with International Patent Application No. PCT/JP2019/031801, dated Sep. 24, 2019.
Office Action dated Jun. 18, 2020 for corresponding South Korean Patent Application No. 10-2020-7005809.

* cited by examiner

*Primary Examiner* — Michael Bernshteyn
(74) *Attorney, Agent, or Firm* — Foley & Lardner LLP

(57) ABSTRACT

A separation membrane sheet that causes a specific fluid component to selectively permeate therethrough, comprises: a first porous layer; and a resin composition layer formed on the first porous layer. The resin composition layer has a filtration residue fraction of greater than or equal to 20% and less than or equal to 90%; and contains a resin having an ionic group or a salt thereof, and has an ion exchange capacity of greater than or equal to 1 millimole equivalent per 1 g of a dry resin in a filtration residue.

21 Claims, 11 Drawing Sheets ic # SEPARATION MEMBRANE SHEET, SEPARATION MEMBRANE ELEMENT, SEPARATION MEMBRANE MODULE, AND MANUFACTURING METHOD FOR SEPARATION MEMBRANE SHEET

CROSS-REFERENCE TO RELATED APPLICATIONS

The present application claims priority under 37 U.S.C. § 371 to International Patent Application No. PCT/JP2019/031801, filed Aug. 13, 2019, which claims priority to and the benefit of Japanese Patent Application No. 2018-162868, filed on Aug. 31, 2018. The contents of these applications are hereby incorporated by reference in their entireties.

TECHNICAL FIELD

The present invention relates to a separation membrane sheet, a separation membrane element, a separation membrane module, and a manufacturing method for a separation membrane sheet.

BACKGROUND ART

Energy saving can be realized as a process of separating an acidic gas such as carbon dioxide from a synthesis gas, a natural gas, and an exhaust gas and the like that are synthesized in a production plants that produces hydrogen and urea and the like, whereby an acidic gas membrane separation process recently becomes a focus of attention. In the acidic gas membrane separation process, it has been known to use an acidic gas separation membrane sheet including a gel layer (for example, Japanese Patent Laying-Open No. 7-275672 (PTL 1), Japanese Patent Laying-Open No. 2013-27841 (PTL 2)).

CITATION LIST

Patent Literature

PTL 1: Japanese Patent Laying-Open No. 7-275672
PTL 2: Japanese Patent Laying-Open No. 2013-27841
PTL 3: Japanese Patent Laying-Open No. 10-57787
PTL 4: Japanese Patent Laying-Open No. 2003-251163

SUMMARY OF INVENTION

Technical Problem

It is an object of the present invention to provide a separation membrane sheet, a separation membrane element, a separation membrane module, and a manufacturing method for such a separation membrane sheet that can exhibit excellent permeation performance and separation performance (hereinafter, both the performances may be collectively referred to as "permselectivity") and can maintain excellent permselectivity for a long period of time.

Solution to Problem

The present invention provides the following separation membrane sheet, separation membrane element, separation membrane module, and manufacturing method for the separation membrane sheet.

[1] A separation membrane sheet that causes a specific fluid component to selectively permeate therethrough, the separation membrane sheet comprising:
a first porous layer; and
a resin composition layer formed on the first porous layer, wherein:
the resin composition layer has a filtration residue fraction of greater than or equal to 20% and less than or equal to 90%; and
contains a resin having an ionic group or a salt thereof, and has an ion exchange capacity of greater than or equal to 1 millimole equivalent per 1 g of a dry resin in a filtration residue.

[2] The separation membrane sheet according to [1], further comprising a second porous layer.

[3] The separation membrane sheet according to [2], wherein the second porous layer is laminated on an opposite side of the resin composition layer from the first porous layer.

[4] The separation membrane sheet according to any one of [1] to [3], wherein the ionic group is an ionic group exhibiting acidity.

[5] A separation membrane sheet according to [4], wherein the ionic group exhibiting acidity is a carboxyl group.

[6] The separation membrane sheet according to any one of [1] to [5], wherein the specific fluid component is an acidic gas.

[7] The separation membrane sheet according to [6], wherein the resin composition layer further contains a substance that reversibly reacts with an acidic gas.

[8] A separation membrane element comprising the separation membrane sheet according to any one of [1] to [7].

[9] The separation membrane element according to [8], further comprising:
a perforated central tube; and
an element-use laminated body including the separation membrane sheet according to any one of [1] to [7],
wherein the element-use laminated body is wound around the perforated central tube.

[10] A separation membrane module comprising:
at least one separation membrane element according to [8] or [9];
a source fluid feeding port for feeding a source fluid to the separation membrane sheet;
a retentate fluid discharge port for discharging a source fluid that has not permeated through the separation membrane sheet; and
a permeate fluid discharge port for discharging the specific fluid component that has permeated through the separation membrane sheet.

[11] A separation device comprising at least one separation membrane module according to [10].

[12] A hydrogen production device comprising at least one separation membrane module according to [10],
wherein:
the source fluid is a source gas containing hydrogen and carbon dioxide; and
the specific fluid component contains carbon dioxide.

[13] A manufacturing method for a separation membrane sheet that causes a specific fluid component to selectively permeate therethrough,
the method comprising a step of forming a resin composition layer on a first porous layer,
wherein the step of forming the resin composition layer includes a step of irradiating an application layer formed on the first porous layer with an electron beam having an irradiation amount of greater than or equal to 10 kGy and less than 1000 kGy.

[14] The manufacturing method for a separation membrane sheet according to [13], wherein the resin composition layer has a filtration residue fraction of greater than or equal to 20% and less than or equal to 90%.

[15] The manufacturing method for a separation membrane sheet according to [13] or [14],
wherein:
the step of forming the resin composition layer further includes a step of obtaining a laminated body by laminating a second porous layer on an opposite side of the application layer from the first porous layer; and
the step of irradiating the application layer with the electron beam is a process of irradiating the application layer of the laminated body with an electron beam.

[16] The manufacturing method for a separation membrane sheet according to any one of [13] to [15], wherein the resin composition layer contains a resin having an ionic group or a salt thereof, and has an ion exchange capacity of greater than or equal to 1 millimole equivalent per 1 g of a dry resin in a filtration residue.

[17] The manufacturing method for a separation membrane sheet according to [16], wherein the ionic group is an ionic group exhibiting acidity.

[18] The manufacturing method for a separation membrane sheet according to [17], wherein the ionic group exhibiting acidity is a carboxyl group.

[19] The manufacturing method for a separation membrane sheet according to any one of [13] to [18], wherein the application layer contains a non-crosslinked polymer.

[20] The manufacturing method for a separation membrane sheet according to [19], wherein the application layer further contains a crosslinked polymer.

[21] The manufacturing method for a separation membrane sheet according to any one of [13] to [20], wherein the specific fluid component is an acidic gas.

[22] The manufacturing method for a separation membrane sheet according to [21], wherein the application layer further contains a substance that reversibly reacts with an acidic gas.

[23] The manufacturing method for a separation membrane sheet according to any one of [13] to [22], wherein the irradiation amount of the electron beam with which the application layer is irradiated is adjusted by at least one of the number of irradiations and irradiation time of the electron beam.

Advantageous Effect of Invention

According to the separation membrane sheet of the present invention, excellent permselectivity can be exhibited, and excellent permselectivity can be maintained for a long time.

DESCRIPTION OF EMBODIMENTS (Separation Membrane Sheet)

Figure 1:
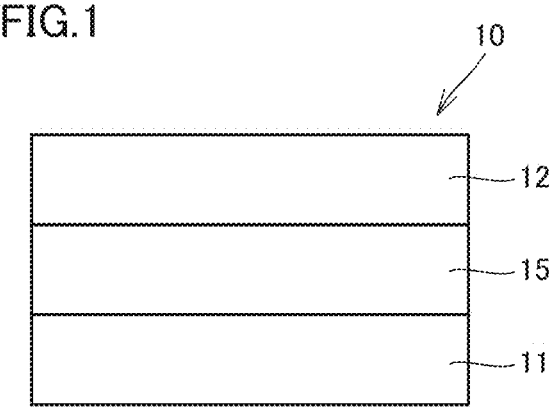
FIG. 1 is a cross-sectional view showing an example of a separation membrane sheet of the present invention.

A separation membrane sheet of the present invention is a separation membrane sheet that causes a specific fluid component to selectively permeate therethrough, and includes a first porous layer and a resin composition layer formed on the first porous layer. The resin composition layer has a filtration residue fraction of greater than or equal to 20% and less than or equal to 90%. The filtration residue fraction can be measured by a procedure to be described later. The filtration residue fraction is preferably 25% or more, and more preferably 30% or more. The filtration residue fraction is preferably 80% or less, and more preferably 75% or less. If the filtration residue fraction is low, part or all of the resin composition layer may penetrate through pores of the first porous layer in the process of separating the fluid component, and lack. The life performance of the permeation performance and separation performance of the fluid component (hereinafter, both the performances may be collectively referred to as "permselectivity") tend to be reduced. When the filtration residual fraction is high, the flexibility of the resin composition layer is lowered, and the adhesiveness between the resin composition layer and the first porous layer tends to be deteriorated.

The resin composition layer contains a resin having an ionic group or a salt thereof. Examples of the ionic group or salt thereof contained in the resin include the same as an ionic group or salt thereof that can be contained in a hydrophilic resin to be described later. The ionic group is preferably an ionic group exhibiting acidity, and for example, a carboxyl group (—COOH) is preferable.

The resin composition layer has an ion exchange capacity of greater than or equal to 1 millimole equivalent per 1 g of a dry resin in a filtration residue. The ion exchange capacity is preferably greater than or equal to 1.02 millimole equivalent, more preferably greater than or equal to 1.04 millimole equivalent. The ion exchange capacity may be greater than or equal to 1.1 millimole equivalent, greater than or equal to 1.2 millimole equivalent, greater than or equal to 1.3 millimole equivalent, greater than or equal to 1.4 millimole equivalent, greater than or equal to 1.5 millimole equivalent, and greater than or equal to 3 millimole equivalent. The ion exchange capacity is usually less than or equal to 30 millimole equivalent, and may be less than or equal to 10 millimole equivalent, or less than or equal to 5 millimole equivalent.

The ion exchange capacity is the number of ionic groups per unit weight of the resin, and is defined as the equivalent number of ionic groups contained per 1 g of a dry resin of a resin contained in the resin composition layer. The ion exchange capacity can be measured by a method described in Examples to be described later. The dry resin refers to a resin obtained by holding the resin at a temperature equal to or higher than the boiling point of a medium (for example, water), so that there is almost no weight decrease, and thus a change in weight with time is converged on almost a constant value.

The separation membrane sheet can include a second porous layer. The second porous layer may be laminated on an opposite side of the resin composition layer from the first porous layer so as to be in contact with the resin composition layer, or with another layer interposed therebetween. The second porous layer may be laminated on an opposite side of the first porous layer from the resin composition layer so as to be in contact with the first porous layer, or with another layer interposed therebetween. As the first porous layer and the second porous layer, those having a structure to be described later or those formed of a material to be described later can be used.

Examples of the fluid component selectively permeating through by the separation membrane sheet include a gas and a liquid. The separation membrane sheet can be used as, for example, a separation membrane sheet that causes an acidic gas to selectively permeate therethrough, or a separation membrane sheet that causes specific ions to selectively permeate therethrough, as described later. The separation membrane sheet makes it possible to exhibit excellent permselectivity, and maintain excellent permselectivity for a long time.

(Manufacturing Method for Separation Membrane Sheet)

A manufacturing method for a separation membrane sheet of the present invention is a manufacturing method for a separation membrane sheet that causes a specific fluid component to selectively permeate therethrough, the method comprising a step of forming a resin composition layer on a first porous layer, wherein the step of forming the resin composition layer includes a step of irradiating an application layer formed on the first porous layer with an electron beam having an irradiation amount of greater than or equal to 10 kGy and less than 1000 kGy. The irradiation amount of the electron beam is preferably greater than or equal to 14 kGy, more preferably greater than or equal to 18 kGy, and still more preferably greater than or equal to 20 kGy. The irradiation amount of the electron beam is preferably less than or equal to 800 kGy, more preferably less than or equal to 600 kGy, and still more preferably less than or equal to 500 kGy. When the irradiation amount of the electron beam is within the above ranges, the filtration residue fraction of the resin composition layer is likely to be adjusted to greater than or equal to 20% and less than or equal to 90%. The acceleration voltage of the electron beam is usually greater than or equal to 10 keV and less than or equal to 500 keV, and preferably greater than or equal to 100 keV and less than or equal to 300 keV.

The step of forming the resin composition layer may further include a step of obtaining a laminated body in which the second porous layer is laminated on a side opposite of the application layer from the first porous layer, and the step of irradiating with the electron beam may be a process of irradiating the application layer included in the laminated body with an electron beam. As described above, the resin composition layer may contain a resin containing an ionic group exhibiting acidity or a salt thereof.

As will be described later, the application layer can be formed by applying an application liquid to the first porous layer, and may contain a non-crosslinked polymer. The application layer may further contain a crosslinked polymer. The application liquid is used for forming a resin composition layer, and contains an application liquid polymer that may be a resin contained in the resin composition layer and a medium. The application liquid may contain a substance that reversibly reacts with a fluid component, a surfactant, or the like as necessary. As the application liquid polymer, the medium, the substance that reversibly reacts with a fluid component, and the surfactant and the like, for example, those to be described later can be used.

Hereinafter, the case where the separation membrane sheet is an acidic gas separation membrane sheet will be described as an example with reference to the drawings.

(Acidic Gas Separation Membrane Sheet)

FIG. 1 is a cross-sectional view showing an example of a separation membrane sheet. As shown in FIG. 1, an acidic gas separation membrane sheet, which is an example of the separation membrane sheet of the present invention, is an acidic gas separation membrane sheet 10 (separation membrane sheet) that causes an acidic gas (specific fluid component) to selectively permeate therethrough. Acidic gas separation membrane sheet 10 includes a first porous layer 11, and a hydrophilic resin composition layer 15 (resin composition layer) containing a hydrophilic resin (resin) and formed on the first porous layer 11. Hydrophilic resin composition layer 15 has a filtration residue fraction of greater than or equal to 20% and less than or equal to 90%. Hydrophilic resin composition layer 15 contains a resin having an ionic group or a salt thereof, and has an ion exchange capacity of greater than or equal to 1 millimole equivalent per 1 g of a dry resin in a filtration residue.

As shown in FIG. 1, acidic gas separation membrane sheet 10 may be one in which hydrophilic resin composition layer 15 is provided on first porous layer 11, or one in which a second porous layer 12 is further provided on an opposite side of hydrophilic resin composition layer 15 from first porous layer 11. The hydrophilic resin composition layer may contain a substance that reacts reversibly with an acidic gas (hereinafter may be referred to as an "acidic gas carrier").

Acidic gas separation membrane sheet 10 has an acidic gas selective permeability that causes an acidic gas to selectively permeate therethrough in order to separate the acidic gas from a source gas (source fluid). The acidic gas means carbon dioxide ($CO_2$), hydrogen sulfide ($H_2S$), carbonyl sulfide, sulfur oxide ($SO_x$), nitrogen oxide ($NO_x$), or hydrogen halide such as hydrogen chloride. The source gas means a gas fed to a gas separation membrane element to be described later, and the source gas contains at least an acidic gas.

In acidic gas separation membrane sheet 10, the high selective permeability of the acidic gas can be realized by a solution/diffusion mechanism and a facilitated transport mechanism in hydrophilic resin composition layer 15. The solution/diffusion mechanism is a mechanism that separates an acidic gas utilizing a difference between solubilities of gas components contained in a source gas in a membrane material and a difference between diffusivities of the gas components contained in the source gas in a membrane. The facilitated transport mechanism is a mechanism in which an acidic gas contained in a source gas and an acidic gas carrier contained in a membrane material form a reaction product to promote the permeation of the acidic gas.

The following reaction formula (1) represents a reaction of $CO_2$ and a $CO_2$ carrier when the acidic gas is $CO_2$ and cesium carbonate ($Cs_2CO_3$) is used as the acidic gas carrier ($CO_2$ carrier). The symbol "↔" in the reaction formula (1) indicates that this reaction is a reversible reaction.

$$CO_2 + Cs_2CO_3 + H_2O \leftrightarrow 2CsHCO_3 \qquad (1)$$

As shown by the above reaction formula (1), water is necessary for the reversible reaction of $CO_2$ and the $CO_2$ carrier. That is, in acidic gas separation membrane 10 in which the acidic gas is $CO_2$, as shown by the above reaction formula (1), water in the membrane material causes the amount of permeation of the acidic gas to change. As the amount of the water in the membrane material is more, the amount of permeation of the acidic gas is more.

(Hydrophilic Resin Composition Layer)

Hydrophilic resin composition layer 15 may be a gel-like layer containing a hydrophilic resin. Hydrophilic resin composition layer 15 may contain an acidic gas carrier, and may contain an additive other than the hydrophilic resin and the acidic gas carrier, as necessary.

The filtration residue fraction of hydrophilic resin composition layer 15 is greater than or equal to 20%, preferably greater than or equal to 25%, and more preferably greater than or equal to 30%. The filtration residue fraction is less than or equal to 90%, preferably less than or equal to 80%, and more preferably less than or equal to 75%. Even when the filtration residue fraction is within the above ranges, and the gas separation membrane element using acidic gas separation membrane sheet 10 is used under high temperature and high humidity operating conditions such as a temperature of 140° C. and a humidity of 94% RH, excellent permeation performance (permeance) and separation performance of the acidic gas (hereinafter, both the performance may be collectively referred to as "gas permselectivity") can be provided, and an excellent life performance allowing the excellent gas s permselectivity to be maintained over a long period of time can be achieved.

In contrast, when the filtration residue fraction is low, part or all of hydrophilic resin composition layer 15 may penetrate through pores of first porous layer 11 in the process of continuously performing gas separation using acidic gas separation membrane sheet 10, and lack. The life performance of the gas permselectivity tends to be reduced. If the filtration residue fraction is high, the flexibility of hydrophilic resin composition layer 15 is lowered, and the adhesiveness between hydrophilic resin composition layer 15 and first porous layer 11 is apt to be lowered. Therefore, acidic gas separation membrane sheet 10 is apt to be damaged by a mechanical load received in a processing process or the like when acidic gas separation membrane sheet 10 is used for the gas separation membrane element, so that the gas permselectivity tends to be lowered.

The filtration residue fraction is a value calculated based on the following formula (I) using values measured by the following procedure. That is, (1) a sample cut out in a size of 5 cm×5 cm from an acidic gas separation membrane sheet 10 is immersed in 50 mL of water at a temperature of 20° C., and a hydrophilic resin composition layer 15 is sufficiently dispersed in water to obtain a hydrophilic resin composition dispersed water.

(2) The hydrophilic resin composition dispersed water is subjected to natural filtration without stirring and pressurization using a 60 mesh filter material (material: nylon 66PA, wire diameter: 165 μm, mesh opening: 258 μm; for example, available from Tokyo Screen as nylon mesh NB60 (trade name)), to obtain a filtration residue and a filtrate after 5 minutes from the start of filtration.

(3) The obtained filtration residue and filtrate are vacuum-dried for 24 hours in a vacuum oven at a temperature of 100° C. (for example, trade name: vacuum dryer AVO-250N, manufactured by AS ONE Corporation), and the weights of the filtration residue and filtrate after vacuum drying are then measured as a solid content weight [g].

(4) Based on the obtained solid content weight, the filtration residue fraction is calculated based on the following formula (I):

Filtration residue fraction [%]{weight of solid content of filtration residue [g]/(weight of solid content of filtration residue [g]+weight of solid content of filtrate [g])}×100     (I).

Hydrophilic resin composition layer 15 has an ion exchange capacity of greater than or equal to 1 millimole equivalent per 1 g of dry resin in a filtration residue. It is preferable that the resin contained in hydrophilic resin composition layer 15 has an ionic group or a salt thereof from the viewpoint of obtaining water retainability necessary for the permeation of the acidic gas in the acidic gas separation membrane sheet, and the hydrophilic resin contained in hydrophilic resin composition layer 15 has an ionic group or a salt thereof. The ion exchange capacity of hydrophilic resin composition layer 15 is preferably greater than or equal to 1.02 millimole equivalent, more preferably greater than or equal to 1.04 millimole equivalent. The ion exchange capacity may be greater than or equal to 1.1 millimole equivalent, greater than or equal to 1.2 millimole equivalent, greater than or equal to 1.3 millimole equivalent, greater than or equal to 1.4 millimole equivalent, greater than or equal to 1.5 millimole equivalent, or greater than or equal to 3 millimole equivalent. The ion exchange capacity is usually less than or equal to 30 millimole equivalent, and may be less than or equal to 10 millimole equivalent, or less than or equal to 5 millimole equivalent.

The ion exchange capacity is determined as the equivalent number of ionic groups contained per 1 g of a dry resin in the filtration residue of hydrophilic resin composition layer 15, and can be measured by the method described in Examples to be described later. The dry resin refers to a resin obtained by holding the filtration residue at a temperature equal to or higher than the boiling point of water, so that there is almost no weight decrease, and thus a change in weight with time is converged on almost a constant value.

Examples of the ionic group that may be contained in the resin contained in hydrophilic resin composition layer 15 include an ionic group exhibiting acidity (that is, a cation-exchangeable ion-exchange group) or an ionic group exhibiting basicity (that is, an anion-exchangeable ion-exchange group). It is preferable that the resin contains an ionic group exhibiting acidity (a cation-exchangeable ion-exchange group) from the viewpoint of obtaining necessary water retainability. Examples of the ionic group that may be contained in the resin contained in hydrophilic resin composition layer 15 and exhibits acidity include a carboxyl group (—COOH), a sulfo group (—SO$_3$H), a phosphono group (—PO$_3$H$_2$), a sulfonylimide group (—SO$_2$NHSO$_2$.), and a phenolic hydroxyl group. The salt of the ionic group is a group in which the ionic group is partially or totally exchanged with metal ions or quaternary ammonium ions or the like to form a salt, such as —COONa. It is preferable that a resin having an ion exchange capacity of greater than or equal to 1 millimole equivalent per 1 g of a dry resin in a filtration residue has the ionic group or a salt thereof exemplified above, and is a polymer in which the number thereof can satisfy the above ion exchange capacity. It is more preferable that the ionic group is a carboxyl group.

These ionic groups may be introduced into one or both of the main chain and the side chain of the polymer. It is preferable that the ionic group is introduced into the main chain. Here, the main chain of the polymer means the longest chain in the polymer. In general, this chain is composed of carbon atoms that are mutually covalently bonded, and this chain may be interrupted by a nitrogen atom, an oxygen atom, or a sulfur atom or the like.

As described above, the resin contained in hydrophilic resin composition layer 15 is preferably a polymer in which the ionic group is a carboxyl group. The polymer having a carboxyl group preferably contains a structural unit having no substituent other than the carboxyl group on a carbon atom having a carboxyl group among carbon atoms forming the main chain or side chain of the polymer. Specifically, it is preferable that the polymer has a structural unit derived from acrylic acid or a derivative thereof. Examples of the polymer having a carboxyl group include polymers obtained by polymerization of monomers of acrylic acid, itaconic acid, or crotonic acid or the like. Specific examples of the polymer include a polyacrylic acid, a polyitaconic acid, a polycrotonic acid, an acrylic acid-methacrylic acid copolymer, and an acrylic acid-methyl methacrylate copolymer. Among these, a polyacrylic acid that is a polymer of acrylic acid, and an acrylic acid-methacrylic acid copolymer obtained by polymerization of acrylic acid and methacrylic acid are preferable. More preferred is a polyacrylic acid. These polymers may have a crosslinked structure between molecules or within a molecule.

Vinyl alcohol polymers described in Japanese Patent Laying-Open No. 10-57787 (PTL 3), and high-molecular compounds such as polyimide, polysulfone, polyethersulfone, and polyamideimide described in Japanese Patent Laying-Open No. 2003-251163 (PTL 4) do not have the above ionic group.

Hydrophilic resin composition layer 15 can be formed by applying an application liquid containing an application liquid polymer such as a non-crosslinked polymer or a crosslinked polymer, as described later. The resin forming resin composition layer 15 can be obtained by introducing a crosslinked structure into the application liquid polymer without using a crosslinking agent.

Examples of a method for setting the ion exchange capacity of the resin forming hydrophilic resin composition layer 15 within the above range include a method for adjusting the amount of an ionic group of an application liquid polymer used for preparing an application liquid when a crosslinked structure is introduced by electron beam irradiation.

The acidic gas carrier is present in hydrophilic resin composition layer 15 containing the hydrophilic resin, and reversibly reacts with the acidic gas dissolved in water present in hydrophilic resin composition layer 15, whereby the acidic gas carrier can cause the acidic gas to selectively permeate through hydrophilic resin composition layer 15. Hydrophilic resin composition layer 15 preferably contains, as the acidic gas carrier, at least one substance that reversibly reacts with the acidic gas. Specific examples of the acidic gas carrier include, in the case where the acidic gas is carbon dioxide, alkali metal carbonates, alkali metal bicarbonates, alkanolamine (for example, described in Japanese Patent No. 2086581 (Patent Publication No. 7-102310) and the like), and alkali metal hydroxides (for example, described in WO 2016/024523 and the like); in the case where the acidic gas is sulfur oxide, sulfur-containing compounds, citrates of alkali metals, and transition metal complexes (for example, described in Japanese Patent No. 2879057 and the like); and in the case where the acidic gas is nitrogen oxide, alkali metal nitrites and transition metal complexes (for example, described in Japanese Patent No. 2879057 and the like).

Hydrophilic resin composition layer 15 may also contain, for example, a hydration reaction catalyst for the acidic gas, and a surfactant to be described later, and the like as an additive in addition to the hydrophilic resin and the acidic gas carrier. The hydration reaction catalyst for the acidic gas can improve the reaction rate of the acidic gas and the carrier. The hydration reaction catalyst for the acidic gas preferably contains an oxo acid compound, more preferably contains at least one elemental oxo acid compound selected from the group consisting of group 14 elements, group 15 elements, and group 16 elements, and still more preferably contains at least one selected from the group consisting of a tellurious acid compound, a selenious acid compound, an arsenious acid compound, and an orthosilicic acid compound.

The thickness of hydrophilic resin composition layer 15 may be appropriately selected depending on separation performance required for acidic gas separation membrane sheet 10. Usually, it is preferably within a range of 0.1 m to 600 μm, more preferably within a range of 0.5 μm to 400 μm, and particularly preferably within a range of 1 m to 200 μm.

(First Porous Layer and Second Porous Layer)

First porous layer 11 may be a layer to which the application liquid for forming hydrophilic resin composition layer 15 is applied, as described later. First porous layer 11 can have a porosity having high gas permeability so as not to cause the diffusion resistance of the source gas fed to hydrophilic resin composition layer 15, particularly the gas component that is contained in the source gas and selectively permeates through hydrophilic resin composition layer 15 in acidic gas separation membrane sheet 10. First porous layer 11 may have a single-layer structure or a laminated structure including two more layers. It is preferable that first porous layer 11 has heat resistance depending on process conditions in which application of acidic gas separation membrane sheet 10 is assumed. Herein, the term "heat resistance" means that no curl occurs which can be visually confirmed due to heat shrinkage or heat melting even after the member such as first porous layer 11 is stored for 2 hours under the temperature conditions greater than or equal to the process condition, so that the form of the member before preservation is maintained.

Second porous layer 12 may be a layer laminated on the exposed surface of hydrophilic resin composition layer 15 formed on first porous layer 11 as described later. Second porous layer 12 can have a porosity having high gas permeability so as not to cause the diffusion resistance of the source gas fed to hydrophilic resin composition layer 15, particularly the gas component that is contained in the source gas and selectively permeates through hydrophilic resin composition layer 15 in acidic gas separation membrane sheet 10. Second porous layer 12 may have a single-layer structure or a laminated structure including two more layers. It is preferable that second porous layer 12 has heat resistance depending on process conditions in a plant in which application of acidic gas separation membrane sheet 10 is assumed.

First porous layer 11 may be hydrophobic, and the contact angle of water at a temperature of 25° C. may be greater than or equal to 90 degrees, greater than or equal to 95 degrees, or greater than or equal to 100 degrees. Second porous layer 12 is preferably hydrophobic. Specifically, in second porous layer 12, the contact angle of water at a temperature of 25° C. is preferably greater than or equal to 90 degrees, more preferably greater than or equal to 95 degrees, and still more preferably greater than or equal to 100 degrees. When a source gas containing moisture is fed to acidic gas separation membrane sheet 10, acidic gas separation membrane sheet 10 may be condensed, and water generated by the condensation may damage hydrophilic resin composition layer 15. However, first porous layer 11 and second porous layer 12 are hydrophobic, whereby the water generated by the condensation penetrates into hydrophilic resin composition layer 15, which can provide suppressed damage to hydrophilic resin composition layer 15. The contact angle of water can be measured with a contact angle meter (for example, manufactured by Kyowa Interface Science Co., Ltd.; trade name: "DropMaster 500").

Each of first porous layer 11 and second porous layer 12 preferably contains a resin material. Examples of the resin material contained in first porous layer 11 and second porous layer 12 include polyolefin resins such as polyethylene (PE) and polypropylene (PP); fluorine-containing resins such as polytetrafluoroethylene (PTFE), polyvinyl fluoride (PVF), and polyvinylidene fluoride (PVDF); polyester resins such as polyethylene terephthalate (PET) and polyethylene naphthalate; and resin materials such as polystyrene (PS), polyethersulfone (PES), polyphenylene sulfide (PPS), polysulfone (PSF), polyacrylonitrile (PAN), polyphenylene oxide (PPO), polyamide (PA), polyimide (PI), polyetherimide (PEI), polyetheretherketone (PEEK), high-molecular-weight polyesters, heat-resistant polyamides, aramids, and polycarbonates.

Among these, from the viewpoint of water repellency, a polyolefin resin or a fluorine-containing resin is preferable. Examples of the materials contained in first porous layer 11 and second porous layer 12 include inorganic materials such as metals, glass, and ceramics in addition to the resin materials, and the inorganic materials and the resin materials may be contained. The resin material forming first porous layer 11 and the resin material forming second porous layer 12 may be the same material or different materials. When first porous layer 11 and second porous layer 12 have a laminated structure including two or more layers, the resin materials forming the layers may be the same material or different materials.

When hydrophilic resin composition layer 15 is formed by irradiating the application layer formed on first porous layer 11 with an electron beam as in a manufacturing method for an acidic gas separation membrane sheet to be described later, it is preferable to select a material that is less likely to be damaged by the irradiation amount (dose) of the electron beam. In particular, when gas separation is performed using an acidic gas separation membrane sheet for a gas separation membrane element to be described later, it is preferable that damages caused by electron beam irradiation are less likely to occur in a porous layer (first porous layer 11 or second porous layer) laminated on the permeate-side of hydrophilic resin composition layer 15. When damages such as wrinkles and cracks occur in the porous layer due to electron beam irradiation, defects such as pinholes and cracks may occur in hydrophilic resin composition layer 15 at a pressure applied to the acidic gas separation membrane sheet when acidic gas separation is performed. When the irradiation amount of the electron beam is greater than or equal to 10 kGy and less than 1000 kGy, examples of the resin material that is less likely to cause the damages as described above include polyolefin resins and fluorine-containing resins.

The thickness of first porous layer 11 and the thickness of second porous layer 12 are not particularly limited, and from the viewpoint of a mechanical strength, the thicknesses are each independently preferably within a range of 10 μm to 3000 μm, more preferably within a range of 10 μm to 500 μm, and still more preferably within a range of 15 μm to 150 μm. The thickness of first porous layer 11 and the thickness of second porous layer 12 may be the same as or different from each other.

The average pore diameter of the pores of first porous layer 11 and the average pore diameter of the pores of second porous layer 12 are each independently preferably greater than or equal to 0.0005 μm, more preferably greater than or equal to 0.001 μm, and still more preferably greater than or equal to 0.005 μm. The average pore diameters are preferably less than or equal to 10 μm, more preferably less than or equal to 5 μm, and still more preferably less than or equal to 1 μm. The porosity of first porous layer 11 and the porosity of second porous layer 12 are preferably within a range of 5% to 99%, and more preferably within a range of 30% to 90%. The porosity of first porous layer 11 and the porosity of second porous layer 12 may be the same as or different from each other.

The maximum pore diameter of the pores of first porous layer 11 is preferably less than or equal to 8 μm, more preferably less than or equal to 4 μm, still more preferably less than or equal to 0.8 μm, and usually greater than or equal to 0.005 μm.

In acidic gas separation membrane sheet 10, a porous body may be further laminated on surfaces of first porous layer 11 and second porous layer 12 not in contact with hydrophilic resin composition layer 15 for the purpose of additionally imparting a strength to first porous layer 11 and second porous layer 12. As the porous body, non-woven fabrics or woven fabrics containing the resin materials, inorganic materials, or the resin and inorganic materials, exemplified in connection with first porous layer 11 and second porous layer 12 can be suitably used.

(Manufacturing Method for Acidic Gas Separation Membrane Sheet)

Hereinafter, an example of a manufacturing method for an acidic gas separation membrane sheet 10 will be described with reference to the drawings. FIGS. 2 to 5 show a schematic view of a manufacturing device for an acidic gas separation membrane sheet 10. A manufacturing method for an acidic gas separation membrane sheet 10 includes a step of forming a hydrophilic resin composition layer 15 on a first porous layer 11, wherein the step of forming hydrophilic resin composition layer 15 includes a step of irradiating an application layer formed on first porous layer 11 with an electron beam having an irradiation amount of greater than or equal to 10 kGy and less than 1000 kGy (hereinafter may be referred to as a "step of irradiation with the electron beam"), and hydrophilic resin composition layer 15 contains a hydrophilic resin. The ion exchange capacity per 1 g of a dried resin in the filtration residue of hydrophilic resin composition layer 15 may be greater than or equal to 1 millimole equivalent.

In the step of irradiation with the electron beam, the application layer may be irradiated with the electron beam from the side of the application layer or from the side of first porous layer 11.

The step of forming hydrophilic resin composition layer 15 may include a step of applying an application liquid to first porous layer 11 to form a liquid layer (hereinafter may also be referred to as a "step of forming the liquid layer"). The liquid layer may be formed through a step of drying in which at least a part of the medium is removed from the application liquid on first porous layer 11, and the application layer may be formed by the step of drying.

The step of forming hydrophilic resin composition layer 15 may further include a step of obtaining a laminated body 18 in which second porous layer 12 is laminated on an opposite side of the application layer from first porous layer 11. In this case, in the step of irradiation with the electron beam, the application layer is irradiated with the electron beam from the side of first porous layer 11 or from the side of second porous layer 12.

The step of obtaining the laminated body 18 may include a process of forming laminated body 18 by laminating second porous layer 12 on an opposite side of the liquid layer from the first porous layer 11 after the liquid layer forming step (hereinafter may be referred to as a "step of laminating"). The step of laminating may include an additional step of drying the liquid layer on which second porous layer 12 is laminated, and the application layer may be formed by the additional step of drying.

Figure 2:
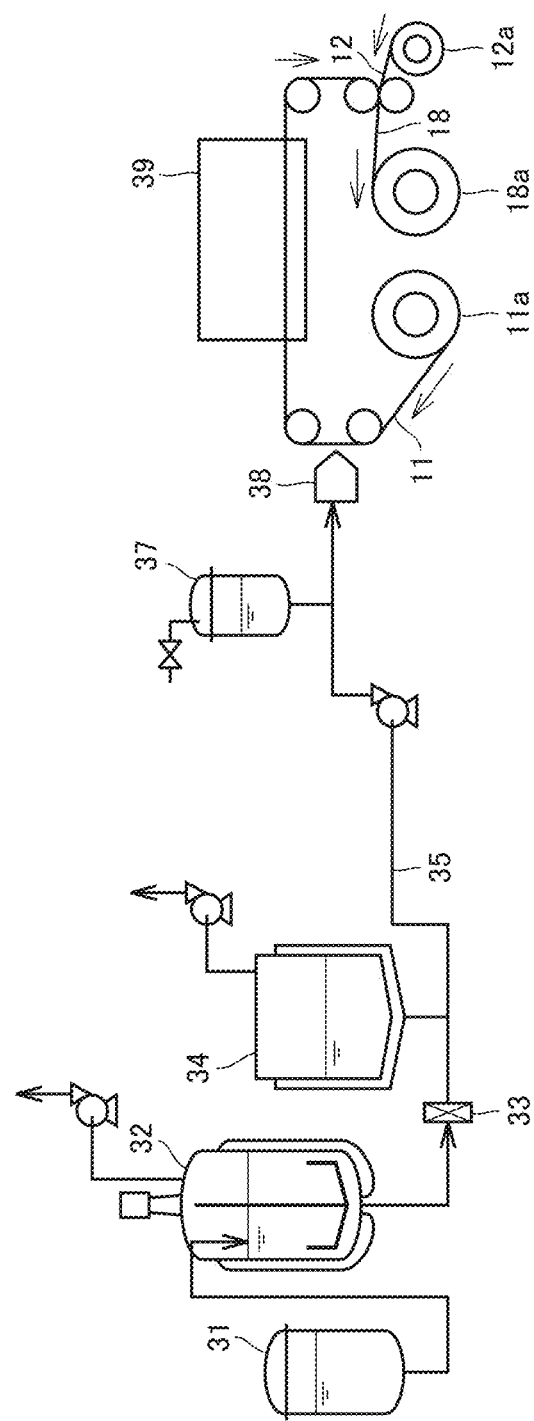
FIG. 2 is a schematic view showing an example of a manufacturing device for a separation membrane sheet of the present invention.

As shown in FIG. 2, acidic gas separation membrane sheet 10 is preferably manufactured in a so-called roll-to-roll method in which a first porous layer 11 is unrolled from a first porous layer rolled body 11a rolled in a roll; a second porous layer 12 is unrolled from a second porous layer rolled body 12a rolled in a roll; a laminated body 18 is obtained while the layers are continuously conveyed; and laminated body 18 is rolled in a roll.

(Step of Forming Hydrophilic Resin Composition Layer 15)

The step of forming hydrophilic resin composition layer 15 is a process of forming hydrophilic resin composition layer 15 containing a hydrophilic resin on first porous layer 11, and may include a step of forming a liquid layer which is a process of forming a liquid layer by applying the application liquid to first porous layer 11. The application liquid is used for forming hydrophilic resin composition layer 15, and contains an application liquid polymer that can be a hydrophilic resin contained in hydrophilic resin composition layer 15 and a medium. The application liquid may contain a substance that reversibly reacts with an acidic gas (acidic gas carrier). The application liquid can be obtained by mixing raw materials such as an application liquid polymer, a medium, and an acidic gas carrier at a temperature at which a raw material composition does not change, for example, normal temperature (usually 20° C.). The obtained application liquid can be stored in a raw material tank 31 as shown in FIG. 2. Raw material tank 31 shown in FIG. 2 may be omitted, and raw materials may be charged into a stirring tank 32, and mixed to prepare the application liquid.

The filtration residue fraction of the application liquid containing the application liquid polymer and the medium is not particularly limited. It is preferably less than 20%, and more preferably less than 15% from the viewpoint of film forming properties of the application liquid. The filtration residue fraction of the application liquid can be calculated in the same procedure except that the application liquid is used in place of hydrophilic resin composition layer 15 in (1) of the above-described calculating method for the filtration residue fraction.

As the application liquid polymer contained in the application liquid, a polymer capable of forming hydrophilic resin composition layer 15 having an ion exchange capacity of greater than or equal to 1 millimole equivalent per 1 g of a dried resin in the filtration residue after electron beam irradiation is preferably used.

Examples of the application liquid polymer include the above-described polymer having a carboxyl group. Examples of the application liquid polymer include a non-crosslinked polymer and a crosslinked polymer, and the application liquid polymer preferably contains a non-crosslinked polymer and a crosslinked polymer. When the application liquid contains the crosslinked polymer and the non-crosslinked polymer, the film-forming property of the application liquid can be improved as compared with the case where the application liquid contains only the crosslinked polymer. The content of the non-crosslinked polymer in the application liquid is preferably greater than or equal to 1 wt %, and more preferably greater than or equal to 2 wt % based on the total weight of the crosslinked polymer and the non-crosslinked polymer. The content is preferably less than or equal to 99 wt %, more preferably less than or equal to 90 wt %, and still more preferably less than or equal to 80 wt %.

Examples of the crosslinked polymer include those obtained by crosslinking a polymer having a carboxyl group. The crosslinked polymer may be prepared by reacting a polymer having a carboxyl group with a crosslinking agent, or may be prepared by polymerizing a monomer having a carboxyl group or an alkyl ester group that becomes a carboxyl group during a hydrolysis reaction and a crosslinkable monomer. The carboxyl group contained in the crosslinked polymer may be totally or partially substituted with carboxylate through neutralization with a metal ion. The metal ion is preferably an alkali metal cation, and the neutralization reaction is preferably performed after the preparation of the crosslinked polymer.

Examples of the monomer having an alkyl ester group include acrylic acid alkyl esters having an alkyl group with 1 to 16 carbon atoms, such as methyl acrylate, ethyl acrylate, propyl acrylate, butyl acrylate, hexyl acrylate, octyl acrylate and lauryl acrylate; itaconic acid alkyl esters having an alkyl group with 1 to 16 carbon atoms, such as methyl itaconate, ethyl itaconate, propyl itaconate, butyl itaconate, hexyl itaconate, octyl itaconate and lauryl itaconate; and crotonic acid alkyl esters having an alkyl group with 1 to 16 carbon atoms, such as methyl crotonate, ethyl crotonate, propyl crotonate, butyl crotonate, hexyl crotonate, octyl crotonate and lauryl crotonate.

The crosslinkable monomer and the crosslinking agent are not particularly limited, and a conventionally known crosslinkable monomer and crosslinking agent can be used. Examples of the crosslinkable monomer include divinylbenzene, N,N'-methylenebisacrylamide, trimethylolpropane triallylether, and pentaerythritol tetraallylether. Examples of the crosslinking agent include an epoxy crosslinking agent, polyvalent glycidyl ether, a polyhydric alcohol, a polyvalent isocyanate, a polyvalent aziridine, a haloepoxy compound, a polyvalent aldehyde, a polyvalent amine, an organometallic crosslinking agent, and a metallic crosslinking agent. As the crosslinkable monomer and the crosslinking agent, those having alkali resistance are preferable. As a crosslinking method, it is possible to use conventionally known techniques such as thermal crosslinking, ultraviolet crosslinking, electron beam crosslinking, radiation crosslinking, and photo-crosslinking (visible light crosslinking) as well as methods described in Japanese Patent Laying-Open Nos. 2003-268009 and 07-88171. The timing of preparing the crosslinked polymer is not particularly limited. The crosslinked polymer is preferably prepared before being mixed with an acidic gas carrier or a non-crosslinked polymer.

The crosslinked polymer may be commercially available one. Examples of the crosslinked polymer of a polyacrylic acid include AQUPEC (registered trademark, manufactured by SUMITOMO SEIKA CHEMICALS CO., LTD.) and SANFRESH (registered trademark, manufactured by Sanyo Chemical Industries, Ltd.).

When the application liquid contains the crosslinked polymer, the crosslinked polymer preferably has a viscosity of higher than or equal to 500 mPa·s and lower than 50000 mPa·s. The viscosity means a value determined by measuring an aqueous 0.2 wt % solution of the crosslinked polymer using a B-type viscometer under the conditions of pH 7 at a temperature of 25° C. and a rotational speed of 20 rpm. When the viscosity is low, the crosslinked polymer has insufficient pressure resistance, and hydrophilic resin composition layer 15 of acidic gas separation membrane sheet 10 may not function as a separation function layer. Meanwhile, when the viscosity is high, it may excessively suppress swelling that is caused by water absorption of the crosslinked polymer, resulting in extreme reduction in a water retention amount. The viscosity of the crosslinked polymer is more preferably greater than or equal to 800 mPa·s and less than 45000 mPa·s, and still more preferably greater than or equal to 1000 mPa·s and less than 40000 mPa·s.

Examples of the non-crosslinked polymer include those obtained using, as a raw material, one or more monomers selected from the group consisting of vinyl acetate, acrylic acid, and derivatives thereof. Examples of one or more monomers selected from the group consisting of vinyl acetate, acrylic acid and derivatives thereof as raw materials for obtaining the non-crosslinked polymer, include vinyl esters of fatty acids with 2 to 16 carbon atoms, such as vinyl acetate, vinyl propionate, vinyl butyrate, vinyl caproate, vinyl laurate, vinyl palmitate, vinyl stearate and vinyl versatate; acrylic acid, and acrylic acid alkyl esters having an alkyl group with 1 to 16 carbon atoms, such as methyl acrylate, ethyl acrylate, propyl acrylate, butyl acrylate, hexyl acrylate, octyl acrylate and lauryl acrylate; itaconic acid, and itaconic acid dialkyl esters having an alkyl group with 1 to 16 carbon atoms, such as dimethyl itaconate, diethyl itaconate, dibutyl itaconate, dihexyl itaconate, dioctyl itaconate and dilauryl itaconate; crotonic acid, and crotonic acid alkyl esters having an alkyl group with 1 to 16 carbon atoms, such as methyl crotonate, ethyl crotonate, propyl crotonate, butyl crotonate, hexyl crotonate, octyl crotonate and lauryl crotonate; and others including acrylamide and acrylonitrile.

Examples of the non-crosslinked polymer obtained by polymerization of one or more monomers selected from the group consisting of vinyl acetate, acrylic acid, and a derivative thereof include polyvinyl alcohol, a polyacrylic acid, a polyitaconic acid, a polycrotonic acid, polyacrylamide, a vinyl alcohol-acrylic acid copolymer, an acrylic acid-methacrylic acid copolymer, an acrylic acid-methyl methacrylate copolymer, and an acrylic acid-acrylamide copolymer. Among these, a polyacrylic acid, an acrylic acid-methacrylic acid copolymer, a vinyl alcohol-acrylic acid copolymer and an acrylic acid-acrylamide copolymer are preferable, and a polyacrylic acid and an acrylic acid-methacrylic acid copolymer are more preferable. These non-crosslinked polymers may be prepared by hydrolysis of polymers obtained by polymerization of one or more monomers selected from the group consisting of vinyl acetate, acrylic acid, and a derivative thereof.

Preferably, the non-crosslinked polymer obtained by polymerization of one or more monomers selected from the group consisting of vinyl acetate, acrylic acid, and a derivative thereof has a structural unit having one or more functional groups selected from the group consisting of a carboxyl group, a hydroxy group and a carbamoyl group. The total content of the structural unit having one or more functional groups selected from the group consisting of a carboxyl group, a hydroxy group and a carbamoyl group included in the non-crosslinked polymer is preferably 50 mol % to 100 mol %, more preferably 60 mol % to 100 mol %, and still more preferably 70 mol % to 100 mol % based on the total amount of all structural units included in the non-crosslinked polymer.

The non-crosslinked polymer may be commercially available one. Examples of the non-crosslinked polymer of polyacrylic acid include AQUPAANA (registered trademark, manufactured by SUMITOMO SEIKA CHEMICALS CO., LTD.) and AQUALIC (registered trademark, manufactured by NIPPON SHOKUBAI CO., LTD.).

The non-crosslinked polymer contained in the application liquid preferably has a viscosity of greater than or equal to 100 mPa·s and less than 1500 mPa·s, and preferably has a lower viscosity than that of the crosslinked polymer. The viscosity is determined by measurement under the same conditions as those in the crosslinked polymer. When the viscosity is low, the film-forming property may be deteriorated, which causes insufficient flexibility of hydrophilic resin composition layer 15. Meanwhile, when the viscosity is high, it may be difficult to synthesize the non-crosslinked polymer. The viscosity of the non-crosslinked polymer is more preferably greater than or equal to 150 mPa·s and less than 1200 mPa·s, and still more preferably greater than or equal to 200 mPa·s and lower than 1000 mPa·s.

As the acidic gas carrier contained in the application liquid, those described above can be used. Examples of the medium contained in the application liquid include protic polar solvents such as water, and alcohols (such as methanol, ethanol, 1-propanol, and 2-propanol); nonpolar solvents such as toluene, xylene, and hexane; and aprotic polar solvents such as ketones (such as acetone, methyl ethyl ketone, and methyl isobutyl ketone), N-methylpyrrolidone, N,N-dimethylacetamide, and N,N-dimethylformamide. A single kind of medium may be used alone, or greater than or equal to two kinds of media may be used in combination as long as they are compatible with each other. Among these, a medium containing at least one selected from the group consisting of water and alcohols (such as methanol, ethanol, 1-propanol, and 2-propanol) is preferable, and a medium containing water is more preferable.

The application liquid may contain a surfactant as necessary. By adding the surfactant to the application liquid, the surfactant is unevenly distributed at the interface between the liquid layer and each of first porous layer 11 and second porous layer 12 when the application liquid is applied to first porous layer 11, or second porous layer 12 is laminated on the liquid layer. This can provide improved wettability of the application liquid with first porous layer 11 and second porous layer 12 to improve the unevenness of the film thickness, and the like. The surfactant is not particularly limited, and, for example, conventionally known surfactants such as polyoxyethylene polyoxypropylene glycols, polyoxyethylene alkyl phenyl ethers, polyoxyethylene alkyl ethers, fluorine-based surfactants, and silicone-based surfactants can be used. A single kind of surfactant may be used alone, or greater than or equal to two kinds of surfactants may be used in combination. The application liquid may contain the hydration reaction catalyst for the acidic gas.

The application liquid preferably does not contain a crosslinking agent. Here, the phrase "not contain a crosslinking agent" means that the content of the crosslinking agent is less than 0.1% by weight with respect to the total weight of the application liquid polymer in the application liquid. As described later, in hydrophilic resin composition layer 15, a crosslinked structure can be introduced into the application liquid polymer contained in the application liquid by electron beam irradiation or the like, whereby the crosslinked structure may not be introduced into the polymer by the crosslinking agent.

In the step of forming the liquid layer in the step of forming hydrophilic resin composition layer 15, for example, as shown in FIG. 2, it is preferable that an application liquid in a stirring tank 32 is sent to a defoaming tank 34 via a filter 33, to remove foreign substances and bubbles contained in the application liquid, and an application liquid that has been subjected to a necessary treatment such as temperature adjustment is preferably applied to first porous layer 11. The application liquid can be applied to first porous layer 11, for example, at a temperature of 15 to 30° C. under atmospheric pressure. The application liquid in defoaming tank 34 is fed to an application liquid tank 37 including a slot die 38, as shown in FIG. 2. By providing the inlet/outlet port of the application liquid on the bottom part of application liquid tank 37, the gas in application liquid tank 37 can be prevented from being mixed into the application liquid fed to slot die 38.

Then, in the step of forming the liquid layer, the application liquid is continuously applied to first porous layer 11 continuously unrolled from a first porous layer rolled body 11a in which first porous layer 11 is rolled in a roll from slot die 38. First porous layer rolled body 11a is preferably obtained by rolling first porous layer 11 having a length of greater than or equal to 10 m, and more preferably greater than or equal to an integral multiple of the unit length of the acidic gas separation membrane sheet required for manufacturing one gas separation membrane element.

FIG. 2 shows applying method for the application liquid using slot die 38. The applying method the application liquid to first porous layer 11 is not limited thereto. Examples of the applying method include spin coating, bar coating, die coating, blade coating, air-knife coating, gravure coating, roll coating, spray coating, dip coating, Comma roll method, kiss coater method, screen printing, and inkjet printing. The application amount of the application liquid in a weight per unit area (solid content per unit area) is preferably within a range of 0.1 g/m$^2$ to 1000 g/m$^2$, more preferably within a range of 0.5 g/m$^2$ to 750 g/m$^2$, and still more preferably within a range of 1 g/m$^2$ to 500 g/m$^2$. The adjustment of the weight per unit area can be controlled on the basis of the applying speed of the application liquid (for example, the conveying speed of first porous layer 11), the concentration of the application liquid, and the discharge amount of the application liquid, and the like. The application liquid may be applied to first porous layer 11 in a stripe pattern or a dot pattern.

The temperature of the application liquid to be applied may be appropriately determined depending on the composition and the density. An excessively high temperature may, however, evaporate the medium from the application liquid applied to first porous layer 11 in a large amount, possibly changing the composition and the density, and leaving a mark of evaporation in hydrophilic resin composition layer 15. The temperature is thus preferably higher than or equal to 15° C., and preferably lower than or equal to the boiling point of the medium in use by 5° C. For example, when water is used as the medium, the temperature of the application liquid applied to first porous layer 11 is preferably within the temperature range of 15° C. to 95° C.

First porous layer 11 to which the application liquid has been applied may be conveyed to, for example, a drying furnace 39 shown in FIG. 2, where a liquid layer is formed by performing a step of drying that removes at least a part of the medium. A process for removing the medium from the application liquid that has been applied to first porous layer 11 is not particularly limited, and a process is preferable, in which heated air and the like is allowed to flow to evaporate the medium for removal, thereby drying the application liquid on first porous layer 11. Specifically, for example, the following process may be performed. The inside of drying furnace 39 is adjusted to a predetermined temperature and a predetermined humidity, and first porous layer 11 to which the application liquid has been applied is carried into drying furnace 39, to evaporate the medium for removal from the application liquid on first porous layer 11.

The drying conditions in the step of drying are preferably selected so that the medium content of the liquid layer is suitable when second porous layer 12 is laminated in a step of laminating in which second porous layer 12 is laminated on the liquid layer. A drying temperature in drying furnace 39 is preferably determined in consideration of the type of the medium contained in the application liquid and the type of first porous layer 11. Usually, the drying temperature in drying furnace 39 is preferably higher than the freezing point of the medium and lower than the melting point of the material forming first porous layer 11. Normally, the drying temperature is suitably within a range of 60° C. to 200° C. The step of drying may be performed in a state where the inside of drying furnace 39 is divided and the sections are set to different temperatures. In this case, the temperatures of the sections of the inlet and outlet portions are preferably lower than the temperature of the section of a central portion.

In the manufacturing method for acidic gas separation membrane sheet 10, the application of the application liquid and the step of drying may be repeated twice or more to form two or more liquid layers. Hydrophilic resin composition layer 15 is formed by laminating two or more liquid layers, whereby the occurrence of pinholes caused by the unevenness and the like of hydrophilic resin composition layer 15 can be suppressed. When two or more liquid layers are formed, coating conditions such as the composition and application amount of the application liquid, and drying conditions may be different from each other in the liquid layers, and may be the same.

In the step of forming hydrophilic resin composition layer 15, following the step of drying, the step of laminating in which laminated body 18 is formed by laminating second porous layer 12 on the liquid layer formed on first porous layer 11 may be performed. Second porous layer 12 is laminated on an opposite side of the liquid layer from first porous layer 11. In the step of laminating, for example, as shown in FIG. 2, second porous layer 12 is continuously unrolled from second porous layer rolled body 12a in which second porous layer 12 is rolled in a roll, and second porous layer 12 is laminated on the exposed surface of the liquid layer formed on first porous layer 11 to form laminated body 18. Second porous layer rolled body 12a is preferably obtained by rolling second porous layer 12 having a length of greater than or equal to 10 m, and more preferably greater than or equal to an integral multiple of the unit length of the acidic gas separation membrane sheet required for manufacturing one gas separation membrane element.

Following the step of laminating, a process of rolling laminated body 18 in a roll may be performed to form a laminate-body rolled body 18a.

Figure 3:
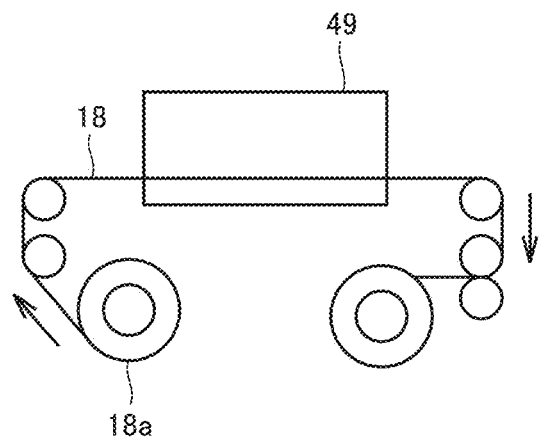
FIG. 3 is a schematic view for illustrating further steps in a manufacturing device for a separation membrane sheet of the present invention.

In the step of forming hydrophilic resin composition layer 15, laminated body 18 may be subjected to an additional step of drying the liquid layer in laminated body 18 following the step of laminating. In the additional step of drying, for example, as shown in FIG. 3, laminated body 18 can be continuously unrolled from a laminate-body rolled body 18a, and conveyed to an additional drying furnace 49 to further remove the medium from the liquid layer in laminated body 18, thereby forming the application liquid. As additional drying furnace 49, the same one as the drying furnace 39 can be used, and a drying temperature when additional drying is performed may be appropriately determined depending on the medium contained in the application liquid, and the types of first porous layer 11 and second porous layer 12. Usually, a drying temperature in additional drying furnace 49 is preferably higher than the freezing point of the medium and lower than the melting point of a material forming first porous layer 11 and second porous layer 12. Normally, the drying temperature is suitably within a range of 60° C. to 200° C. Laminated body 18 conveyed out of the additional drying furnace 49 can be rerolled in a roll.

Since the application layer on the first porous layer formed in the step of forming the hydrophilic resin composition layer is formed by applying the above application liquid, whereby the application layer can contain the above-described application liquid polymer (crosslinked polymer and non-crosslinked polymer).

The case where the process of rolling laminated body 18 in a roll is provided following the step of laminating has been described above as an example. Laminated body 18 may be conveyed to the additional drying furnace without performing the step of rolling laminated body 18 to perform additional drying.

(Electron Beam Irradiation Step)

Figure 4:
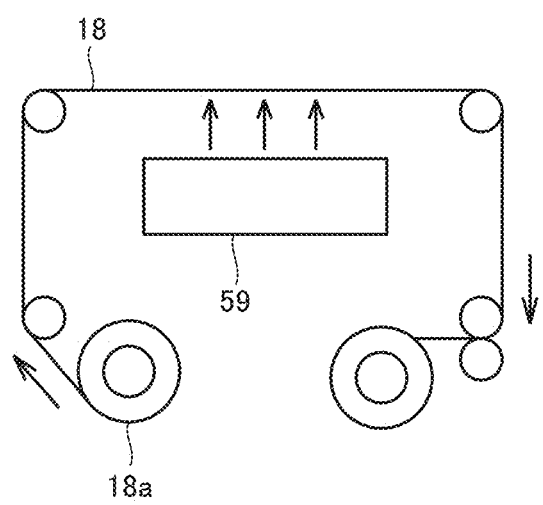
FIG. 4 is a schematic view for illustrating further steps in a manufacturing device for a separation membrane sheet of the present invention.

The step of irradiation with the electron beam is a process of forming hydrophilic resin composition layer 15 on first porous layer 11 by irradiating the application layer formed on first porous layer 11 with an electron beam. In the step of irradiation with the electron beam, for example, as shown in FIG. 4, laminated body 18 is continuously unrolled from laminate-body rolled body 18a that has been subjected to the additional step of drying, and unrolled laminated body 18 is irradiated with an electron beam from an electron beam irradiation device 59 from the side of second porous layer 12, whereby the application liquid polymer in the application layer may be crosslinked within a molecule or between molecules to form hydrophilic resin composition layer 15.

It is presumed that the crosslinking of the application liquid polymer by electron beam irradiation does not involve a functional group such as a carboxyl group contained in the application liquid polymer to form a crosslinked structure, but a carbon atom to which a functional group such as a carboxyl group is bonded is bonded to another carbon atom to form an alkyl chain, thereby forming a crosslinked structure. Therefore, as described above, in the crosslinking by electron beam irradiation, the number of functional groups that may be ionic groups or salts thereof before and after the introduction of the crosslinked structure into the application liquid polymer (that is, before and after electron beam irradiation) does not largely change, and the ion exchange capacity hardly changes. Meanwhile, when the crosslinking agent is used, the functional group such as a carboxyl group contained in the application liquid polymer reacts with the crosslinking agent to introduce the crosslinked structure into the polymer. Therefore, it is considered that the number of functional groups that may be ionic groups or salts thereof changes before and after the introduction of the crosslinked structure, and the ion exchange capacity largely changes, in the crosslinking with the crosslinking agent.

The irradiation amount of the electron beam with which the application layer in laminated body 18 is irradiated is greater than or equal to 10 kGy, preferably greater than or equal to 14 kGy, more preferably greater than or equal to 18 kGy, and still more preferably greater than or equal to 20 kGy. The irradiation amount is less than 1000 kGy, preferably less than or equal to 800 kGy, more preferably less than or equal to 600 kGy, and still more preferably less than or equal to 500 kGy. A small irradiation amount of electron beam makes it difficult to set the filtration residue fraction of hydrophilic resin composition layer 15 to be greater than or equal to 20%, and the application liquid polymer is not sufficiently crosslinked, so that the gas permselectivity of acidic gas separation membrane sheet 10 tends to be deteriorated. A large irradiation amount of electron beam makes it difficult to set the filtration residue fraction of hydrophilic resin composition layer 15 to be less than or equal to 90%. When acidic gas separation membrane sheet 10 is processed for use as the gas separation membrane element, acidic gas separation membrane sheet 10 is apt to be damaged, and the gas permselectivity tends to be deteriorated.

The accelerating voltage of the electron beam with which laminated body 18 is irradiated is usually greater than or equal to 10 keV and less than or equal to 500 keV, and preferably greater than or equal to 100 keV and less than or equal to 300 keV although it depends on the thickness of second porous layer 12. An irradiation atmosphere during electron beam irradiation is not particularly limited. An inert gas atmosphere such as nitrogen gas, argon gas, or helium gas is preferable.

In the step of irradiation with the electron beam, the number of irradiations and irradiation time of the electron beam are adjusted so that the irradiation amount of the electron beam is within the above range depending on the dose of the electron beam irradiated by electron beam irradiation device 59, whereby the irradiation amount of the electron beam can be adjusted. The irradiation amount is a value obtained by multiplying the total amount of the electron beam by the irradiation time and the number of irradiations of the electron beam. Therefore, in the step of irradiation with the electron beam, the electron beam irradiation may be performed in two or more times so as to achieve the above-described irradiation amount.

Hydrophilic resin composition layer 15 obtained by the step of irradiation with the electron beam may be obtained by wholly or partly crosslinking the application liquid polymer. When hydrophilic resin composition layer 15 contains a non-crosslinked polymer in the application layer (application liquid), at least a part of the non-crosslinked polymer may be crosslinked by an electron beam in a molecule or between molecules, and a part of the non-crosslinked polymer may remain without being crosslinked by an electron beam. When the application layer (application liquid) contains the crosslinked polymer together with the non-crosslinked polymer, the crosslinked polymer contained in hydrophilic resin composition layer 15 may be obtained by crosslinking the non-crosslinked polymer by an electron beam in a molecule or between molecules, may be obtained by crosslinking the crosslinked polymer by an electron beam in a molecule or between molecules, or may be obtained by crosslinking the non-crosslinked polymer and the crosslinked polymer by an electron beam between molecules. The crosslinked polymer or the non-crosslinked polymer that is not crosslinked by an electron beam may remain in hydrophilic resin composition layer 15.

In the above, the case where the electron beam irradiation is performed from second porous layer 12 of laminated body 18 has been described as an example. The electron beam irradiation may be performed from first porous layer 11. When second porous layer 12 is not laminated, the application layer may be directly irradiated with an electron beam. In the above, the case where the laminated body is continuously unrolled from the laminate-body rolled body that has been subjected to the additional step of drying to perform electron beam irradiation has been described as an example. The laminated body may be conveyed to electron beam irradiation device 59 for electron beam irradiation without performing the process of winding the laminated body that has been subjected to additional drying.

In the above, the case where the application layer is irradiated with an electron beam to crosslink the application liquid polymer in the application liquid has been described as an example. As the crosslinking method, thermal crosslinking, ultraviolet crosslinking, radiation crosslinking, and photocrosslinking (visible light crosslinking) and the like may be employed, or these may be combined. These crosslinking methods and electron beam crosslinking may be performed in combination.

(Gas Separation Membrane Element)

Acidic gas separation membrane sheet 10 can be used for known gas separation membrane elements such as spiral-wound type, flat-membrane type, pleated type, and plate-and-frame type gas separation membrane elements (separation membrane elements).

Figure 5:
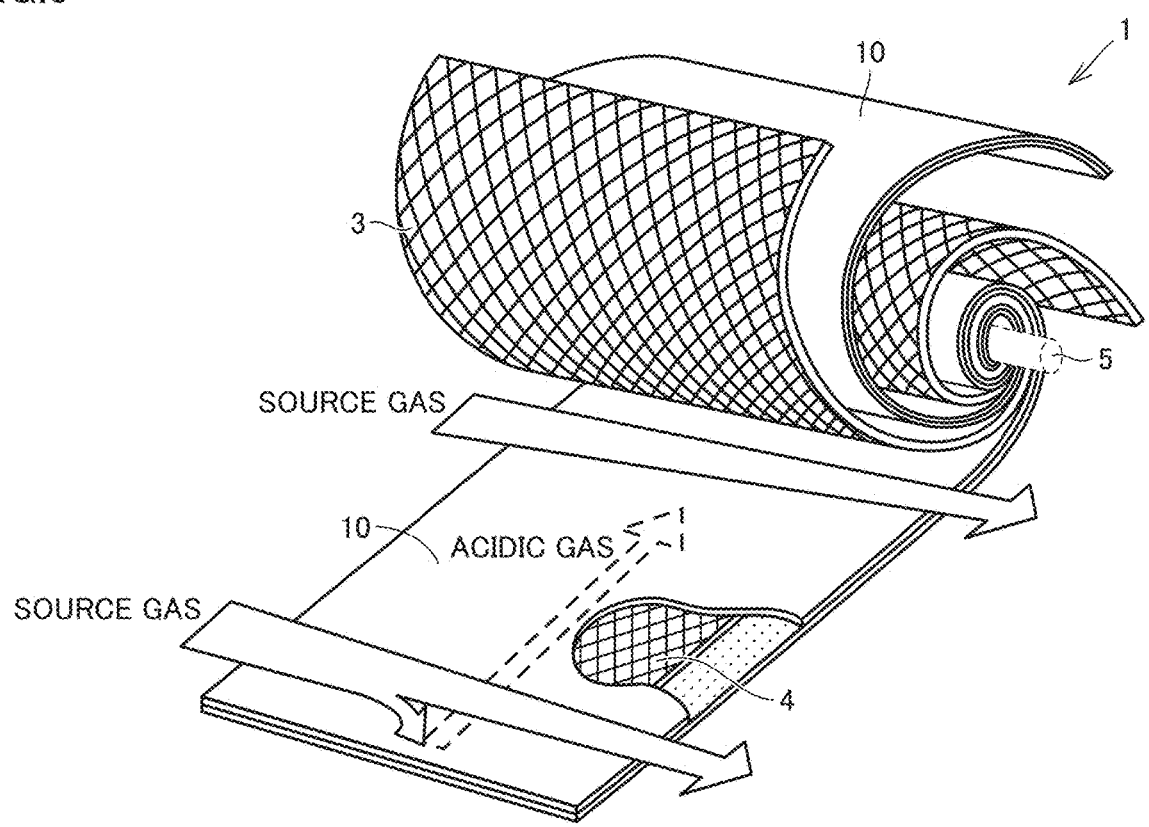
FIG. 5 is a schematic perspective view showing a developed separation membrane element, in which a partially cutout portion is provided.
Figure 6A:
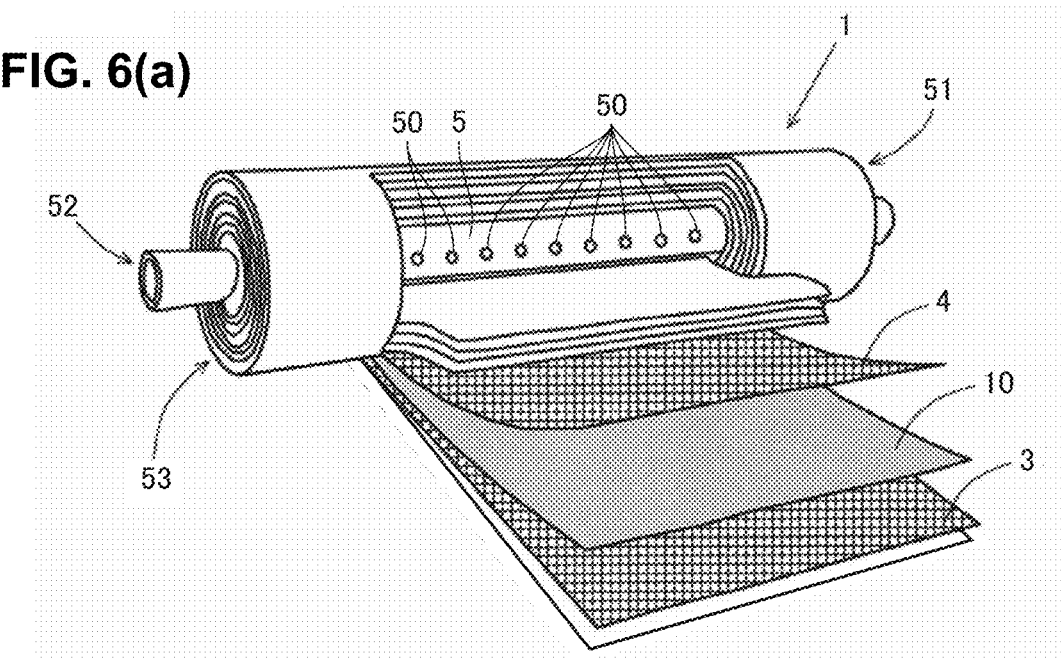
FIG. 6($a$) is a schematic perspective view showing a separation membrane element, in which a partially developed portion is provided, and FIG. 6($b$) is a schematic perspective view showing a separation membrane element provided with an anti-telescope device, in which a partially developed portion is provided.

The case of using the spiral-wound type gas separation membrane element as the gas separation membrane element will be described as an example. FIG. 5 is a schematic perspective view showing a developed spiral-wound type gas separation membrane element, in which a partially cutout portion is provided. FIG. 6(a) is a schematic perspective view showing gas separation membrane element 1 (separation membrane element), in which a partially developed portion is provided, and FIG. 6(b) is a schematic perspective view showing a gas separation membrane element including an anti-telescope device, in which a partially developed portion is provided.

Spiral-wound type gas separation membrane element 1 may include a feed-side flow path member 3 in which a source gas containing an acidic gas flows, an acidic gas separation membrane sheet 10 that selectively separates the acidic gas contained in the source gas flowing in feed-side flow path member 3 to cause the acidic gas to permeate therethrough, a permeate-side flow path member 4 in which the permeate gas containing the acidic gas that has permeated through acidic gas separation membrane sheet 10 flows, a sealing part for preventing the mixing of the source gas with the permeate gas, and a central tube 5 for collecting the permeate gas flowing in permeate-side flow path member 4. The spiral-wound type gas separation membrane element may include a wound body which includes central tube 5 and an element-use laminated body wound around central tube 5. In the element-use laminated body, at least one feed-side flow path member 3, at least one acidic gas separation membrane sheet 10, and at least one permeate-side flow path member 4 are stacked. The wound body may have any shape such as a cylindrical shape or a rectangular cylindrical shape.

Figure 6B:
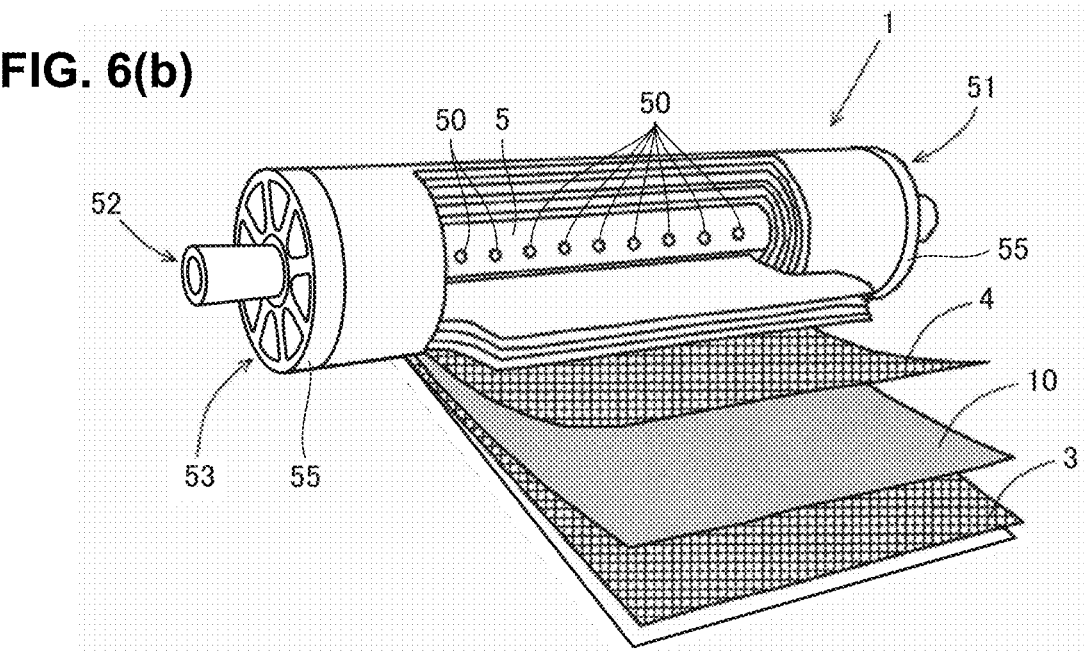

Gas separation membrane element 1 may further include a fixing member (not shown) such as an outer peripheral tape or an anti-telescope device 55 shown in FIG. 6(b) in order to prevent the wound body from being rewound or collapsed in its winding. In order to secure a strength against a load due to internal pressure and external pressure on gas separation membrane element 1, an outer wrap (reinforcing layer) may be provided on the outermost periphery of the wound body.

Feed-side flow path member 3 and permeate-side flow path member 4 preferably have a function of promoting the turbulent flows (surface renewal of the membrane surface) of the source gas and permeate gas that has permeated through acidic gas separation membrane sheet 10 to increase the membrane permeation rate of the permeate gas in the source gas, and a function of reducing the pressure losses of the source gas to be fed and permeate gas that has permeated through acidic gas separation membrane sheet 10 as much as possible. Feed-side flow path member 3 and permeate-side flow path member 4 preferably have a function as a spacer for forming a flow path for the source gas and the permeate gas, and a function of generating turbulent flow in the source gas and the permeate gas, whereby those having a network shape (net shape, mesh shape, and the like) are suitably used. Depending on the network shape, the flow path for the gas changes. Therefore, the shape of the unit cell of the network is preferably selected according to the purpose, for example, from shapes such as a square, a rectangle, a rhombus, and a parallelogram. Materials of feed-side flow path member 3 and permeate-side flow path member 4 are not particularly limited. The materials preferably have heat resistance capable of enduring the operating temperature conditions of gas separation device in which gas separation membrane element 1 is provided.

A sealing part is provided to prevent the mixing of the source gas with the permeate gas. For example, a sealing material penetrates into permeate-side flow path member 4 and acidic gas separation membrane sheet 10, and is cured, whereby the sealing part can be formed. The sealing part can be generally provided at end parts located at both ends in a direction parallel to the axis of central tube 5 of the wound body, and at the end part in which a distance between central tube 5 and the end part is long among end parts located at both ends in a direction orthogonal to the axis of central tube 5 so as to have a so-called envelope shape. A material generally used as an adhesive agent can be used for the sealing part. For example, an epoxy resin and the like can be used.

In order to improve the efficiency of acidic gas separation using the gas separation membrane element, a sweep gas discharged from the gas separation membrane element may be fed along with the permeate gas that has permeate through acidic gas separation membrane sheet 10. The gas separation membrane element used in this case is different from the gas separation membrane element described above in that an additional configuration is provided in central tube 5 and permeate-side flow path member shown in FIG. 5. The other configuration is the same. The gas separation membrane element in the case of feeding the sweep gas includes a blocking member in central tube 5, and a partition member can be extended in a direction perpendicular to central tube 5 at a position corresponding to the blocking member in permeate-side flow channel member 4. The blocking member and the partition member block gas permeation to define a gas flow path. The position of the blocking member may be the vicinity of the center of central tube 5. The position of the blocking member is not particularly limited as long as the blocking member is disposed so as to separate the flow path of the sweep gas fed to permeate-side flow path member 4 in central tube 5 and the flow path of a mixed gas of the permeation gas and sweep gas recovered from permeate-side flow path member 4 from each other. The sweep gas is not particularly limited, and a gas containing at least one selected from the group consisting of air, oxygen, carbon dioxide, nitrogen, argon, helium, and water vapor can be used.

Central tube 5 is a conduit for collecting the permeate gas that has permeated through acidic gas separation membrane sheet 10 and discharging the same from gas separation membrane element 1. Central tube 5 is preferably made of a material that has heat resistance capable of enduring the operating temperature conditions of gas separation device in which gas separation membrane element 1 is provided and a mechanical strength capable of enduring the rolling of the element-use laminated body. As shown in FIGS. 6(*a*) and 6(*b*), central tube 5 has a plurality of holes 50 in the outer peripheral surface of central tube 5. Holes 50 communicate between the flow path space for the permeate gas formed by permeate-side flow path member 4 and an inner hollow space of central tube 5.

When the sweep gas is fed to acidic gas separation membrane sheet 10, the gas separation membrane module can further include a sweep gas feeding port for feeding the sweep gas to the acidic gas separation membrane sheet. The sweep gas feeding port may be provided so as to communicate with an end port of central tube 5 on a side opposite to a discharge port 52 of the gas separation membrane element shown in FIGS. 6(*a*) and 6(*b*). For example, the sweep gas feeding port may be provided in the main body of the gas separation membrane element or a housing that houses the gas separation membrane element.

Gas separation membrane element 1 can be used for a gas separation membrane module (separation membrane module), and the gas separation membrane module includes one or more gas separation membrane elements 1. The gas separation membrane module includes a source gas feeding port (portion communicating with a feed-side end part 51 shown in FIGS. 6(*a*) and 6(*b*)) (source fluid feeding port) for feeding the source gas to the acidic gas separation membrane sheet, a permeate gas discharge port (portion communicating with a discharge port 52 shown in FIGS. 6(*a*) and 6(*b*)) (permeate fluid discharge port) for discharging the permeate gas that has permeated through the acidic gas separation membrane sheet, and a retentate gas discharge port (a portion communicating with a discharge-side end part 53 shown in FIGS. 6(*a*) and 6(*b*)) for discharging the source gas that has not permeated through the acidic gas separation membrane sheet. The source gas feeding port, the retentate gas discharge port, and the permeate gas discharge port may be provided in the main body of the gas separation membrane element, or provided in a container for storing the gas separation membrane element (hereinafter, referred to as "housing").

The housing can form a space for sealing the source gas flowing in the gas separation membrane module. The housing may include, for example, a cylindrical member made of stainless steel and the like, and a blocking member for blocking both the axial ends of the cylindrical member. The housing may have any shape such as a cylindrical shape or a rectangular cylindrical shape. The housing preferably has a cylindrical shape since gas separation membrane element 1 usually has a cylindrical shape. A partition can be provided in the housing to prevent the mixing of the source gas fed to feed-side end part 51 with the retentate gas that has not permeate through acidic gas separation membrane sheet 10 provided in gas separation membrane element 1.

When greater than or equal to two gas separation membrane elements 1 are disposed in the housing, the source gases fed to respective gas separation membrane elements 1 may be fed in parallel or in series. Here, feeding source gases in parallel means that at least the source gases are distributed and introduced into a plurality of gas separation membrane elements. Feeding source gases in series means that at least a permeate gas and/or a retentate gas discharged from upstream gas separation membrane element 1 are/is introduced into downstream gas separation membrane element 1.

In the above description, gas separation membrane element 1 and the gas separation membrane module are obtained using acidic gas separation membrane sheet 10. A separation membrane sheet that causes a specific fluid component to selectively permeate therethrough may be used in place of using acidic gas separation membrane sheet 10 that causes the acidic gas to selectively permeate therethrough. Examples of the specific fluid component include a gas and a liquid.

<Gas Separation Device>

A gas separation device (separation device) includes at least one gas separation membrane module. The arrangement and number of gas separation membrane modules provided in the gas separation device can be selected according to the required throughput, the recovery rate of a specific gas, the size of the place to install the gas separation device, and the like.

(Applications of Acidic Gas Separation Membrane Sheet)

When the acidic gas is carbon dioxide ($CO_2$), acidic gas separation membrane sheet 10 can also remove water vapor simultaneously with $CO_2$ from the source gas containing $CO_2$ and water vapor, whereby the gas separation device including acidic gas separation membrane sheet 10 can be used for various applications. Specifically, the above-described acidic gas separation membrane sheet 10, gas separation membrane module, and gas separation device, and the like can be used to remove $CO_2$ and water vapor contained in combustion exhaust gas or the like generated in a reformed gas obtained by reforming a hydrocarbon and used for hydrogen production or the like; a hydrogen electrochemical oxidation reaction gas generated in a fuel cell or the like; a biogas obtained by biomass methane fermentation or the like; a boiler, or the like.

(Hydrogen Production Device and Hydrogen Production Method Using Gas Separation Membrane Module)

The hydrogen production device can include at least one gas separation membrane module (separation membrane module). In this case, the gas separation membrane module can cause the gas component (specific fluid component) containing carbon dioxide gas to selectively permeate from the source gas (source fluid) containing at least hydrogen and carbon dioxide. The gas separation membrane module provided in the hydrogen production device may be provided as the gas separation device including the gas separation membrane module.

Hydrogen contained in the source gas fed to the gas separation membrane module may be contained in the reformed gas generated by a hydrocarbon reforming reaction. By removing $CO_2$ and water vapor from the reformed gas using acidic gas separation membrane sheet 10, crude refined hydrogen (hydrogen) can be produced. The hydrocarbon reforming reaction can be performed by any one of $CO_2$ reforming using $CO_2$, steam reforming using water vapor, and a combination of these two reformings. Therefore, when crude refined hydrogen is produced, the mixed gas containing $CO_2$ and water vapor recovered by removal using acidic gas separation membrane sheet 10 can be reused for the hydrocarbon reforming reaction after $CO_2$ and water vapor are separated. Thereby, the raw material used for the hydrocarbon reforming reaction can be reduced.

In membrane separation using acidic gas separation membrane sheet 10 provided in the gas separation device or the gas separation membrane module, the treatment amount of membrane separation is determined by the amount of the permeate gas that permeates through acidic gas separation membrane sheet 10. Examples of a method for improving the treatment amount of membrane separation include a method in which the pressure of the source gas fed to the feed-side of acidic gas separation membrane sheet 10 is increased by a compressor or the like, so that the feed-side gas partial pressure is set to be higher than the permeate-side (discharge side of the permeate gas of gas separation membrane sheet 10) gas partial pressure; a method in which the permeate-side of acidic gas separation membrane sheet 10 is set to a reduced-pressure state to set the feed-side gas partial pressure to be higher than the permeate-side gas partial pressure (hereinafter may be referred to as a "pressure reduction method"); a method in which the amount of the permeate gas is increased by supplying a sweep gas to be discharged together with the permeate gas to the permeate-side of acidic gas separation membrane sheet 10 (hereinafter may be referred to as a "sweep method"); and a method in which two or more of the methods are combined. Among these, when at least part of the permeate gas is reused, the pressure reduction method is preferably used because it is not necessary to feed a new gas (sweep gas) to allow only the permeate gas to be separated.

High purity hydrogen can be refined from the crude refined hydrogen obtained as described above. According to this method, energy saving and reduction of hydrogen loss can be expected in a chemical absorption method and a pressure swing adsorption method (PSA), which are purification means, as compared with the case where the reformed gas is refined to high purity hydrogen.

Hereinafter, a preferred embodiment in the case of hydrogen production by using methane ($CH_4$) as a hydrocarbon and performing steam reforming of $CH_4$ or $CO_2$ reforming of $CH_4$ will be described with reference to the drawings. FIGS. 8(a), 8(b), 9(a), 9(b), 10(a), 10(b), 11(a), 11(b), 12(a), and 12(b) are configuration diagrams schematically showing an example of the hydrogen production device using the separation membrane sheet of the present embodiment.

Embodiment 1

Figure 8A:
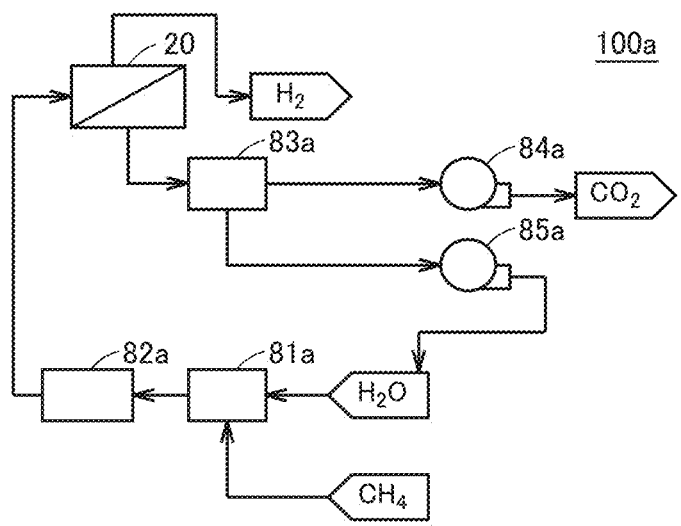
FIGS. 8($a$) and 8($b$) are configuration diagrams schematically showing an example of a hydrogen production device using the separation membrane sheet of the present invention.
Figure 8B:
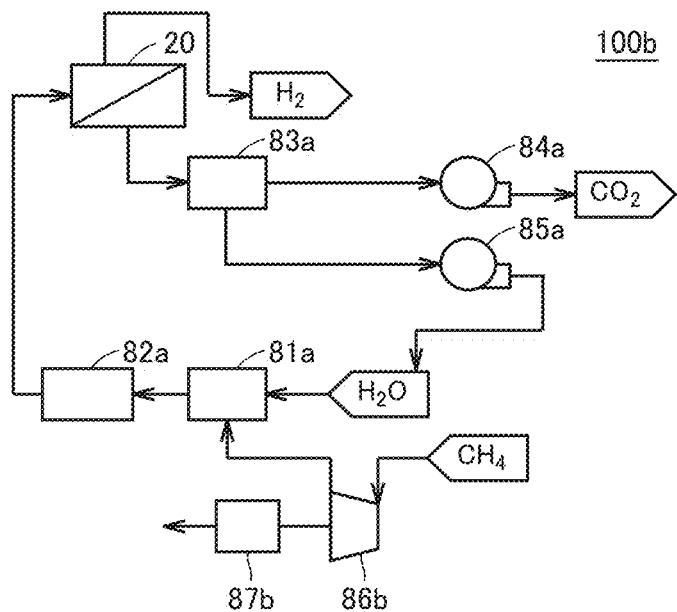
Figure 9A:
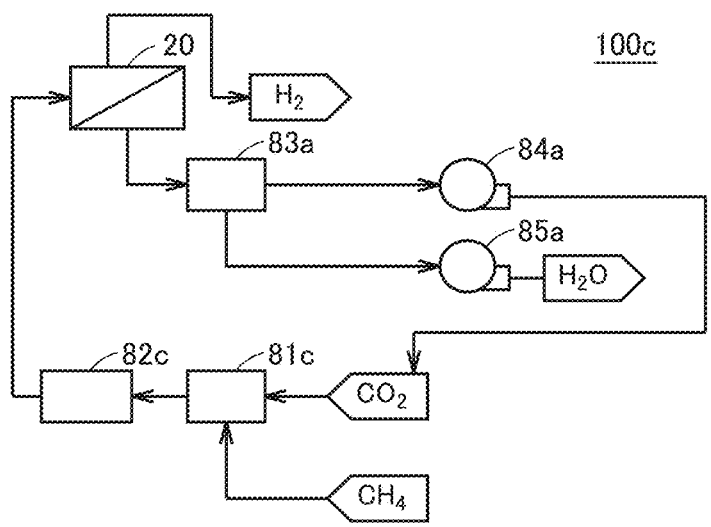
FIGS. 9($a$) and 9($b$) are configuration diagrams schematically showing another example of a hydrogen production device using the separation membrane sheet of the present invention.
Figure 9B:
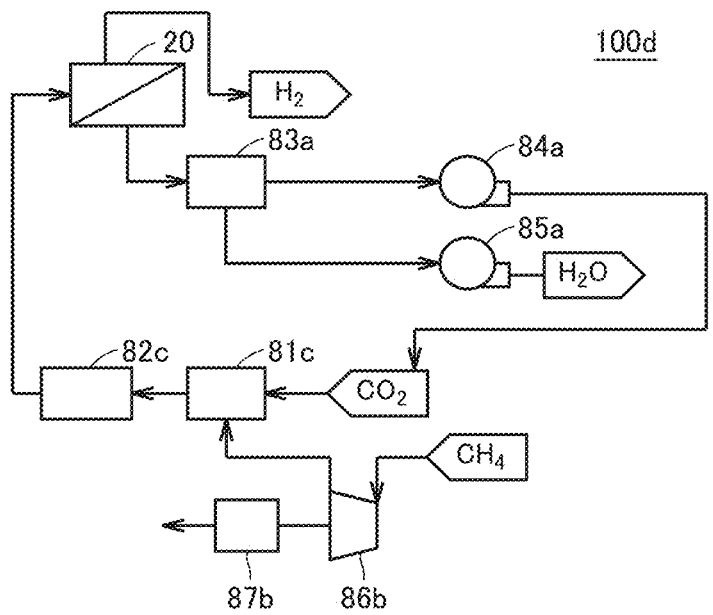

A hydrogen production device 100a shown in FIG. 8(a) is a device for production hydrogen by performing steam reforming, and performs membrane separation according to a pressure reduction method. Hydrogen production device 100a includes a mixer 81a, a water vapor reformer 82a for performing steam reforming, a gas separation device 20 including a gas separation membrane module including an acidic gas separation membrane sheet 10, a condenser 83a, a decompression pump 84a, and a liquid draining pump 85a.

Mixer 81a is used for feeding $CH_4$ and water vapor ($H_2O$ in the figure) as raw materials for steam reforming, to water vapor reformer 82a. Examples of mixer 81a include a mixing device, a vaporizer, a spray atomizer, an ejector, and a combination of two or more thereof.

Water vapor reformer 82a is used for performing steam reforming using $CH_4$ and water vapor fed from mixer 81a. Water vapor reformer 82a can include a reforming unit that reforms $CH_4$ into carbon monoxide (CO) and hydrogen ($H_2$) under a steam reforming reaction shown by the reaction formula (2):

$CH_4+H_2O \leftrightarrow CO+3H_2$ (2), and a conversion unit that converts CO into $CO_2$ and $H_2$ under a CO conversion reaction shown by the reaction formula (3):

$$CO+H_2O \leftrightarrow CO_2+H_2 \qquad (3).$$

Gas separation device 20 includes the gas separation membrane module including acidic gas separation membrane sheet 10, and is used for selectively separating $CO_2$ and water vapor from source gas (reformed gas and water vapor) fed to gas separation device 20. To gas separation device 20, a reformed gas containing $H_2$ and $CO_2$ generated by water vapor reformer 82a is fed, and water vapor fed as a raw material for steam reforming (unreacted water vapor in the raw material) is also contained in the reformed gas. Therefore, in gas separation device 20, $CO_2$ and water vapor selectively pass through acidic gas separation membrane sheet 10 from the fed source gas containing reformed gas and water vapor, so that a mixed gas containing $CO_2$ and water vapor, and crude refined hydrogen enriched with $H_2$ can be separated from each other. In gas separation device 20, the flow direction of the source gas (reformed gas and water vapor) fed to acidic gas separation membrane sheet 10 provided in gas separation device 20, and the flow direction of the permeate gas ($CO_2$ and water vapor) that has permeated through acidic gas separation membrane sheet 10 provided in gas separation device 20 may be either cocurrent or countercurrent.

Condenser 83a is used for separating the mixed gas containing $CO_2$ and water vapor that has permeated through acidic gas separation membrane sheet 10 provided in gas separation device 20 into $CO_2$ and water vapor. $CO_2$ and water vapor are cooled to liquidize water vapor, thereby separating $CO_2$ and water vapor from each other. Decompression pump 84a is used for recovering $CO_2$ separated by condenser 83a. Liquid draining pump 85a is used for recovering water generated by liquefying water vapor in condenser 83a.

In hydrogen production device 100a shown in FIG. 8(a), hydrogen can be produced as follows. First, $CH_4$ and water as raw materials for steam reforming are fed to mixer 81a. Water fed to mixer 81a is not particularly limited as long as it is suitable as a raw material for steam reforming, and may be procured from a device other than hydrogen production device 100a. As shown in FIG. 8(a), water recovered in gas separation device 20 in a method for hydrogen production to be described later may be used. When only water recovered in gas separation device 20 is insufficient as a raw material for steam reforming, water recovered in gas separation device 20, and water procured as water of a shortage from a device other than hydrogen production device 100a may be fed to mixer 81a. $CH_4$ and water vapor mixed by mixer 81a are fed to water vapor reformer 82a, where the steam reforming reaction shown by the reaction formula (2) and the CO conversion reaction shown by the reaction formula (3) is performed to generate $H_2$ and $CO_2$ as the reformed gas.

The generated reformed gas contains unreacted water vapor fed as a raw material for steam reforming, whereby the reformed gas ($H_2$ and $CO_2$) and the source gas containing water vapor are fed to gas separation device 20. Acidic gas separation membrane sheet 10 provided in gas separation device 20 can cause $CO_2$ and water vapor to selectively permeate therethrough, whereby the mixed gas containing $CO_2$ and water vapor and the source gas enriched with $H_2$ are separated from each other in gas separation device 20 to obtain crude refined hydrogen ($H_2$ in the figure). The composition (percentage of $CO_2$ and water vapor) of the permeate gas that permeates through acidic gas separation membrane sheet 10 provided in gas separation device 20 can be adjusted by adjusting the permeate-side pressure. $CO_2$ and water vapor that have selectively permeated through acidic gas separation membrane sheet 10 provided in gas separation device 20 are separated from each other by liquefying water vapor in condenser 83*a*. $CO_2$ is recovered by decompression pump 84*a*, and water generated liquefying water vapor is recovered by liquid draining pump 85*a*. Water recovered by liquid draining pump 85*a* can be reused as a raw material for steam reforming.

In hydrogen production device 100*a* shown in FIG. 8(*a*), the case where $CO_2$ and water vapor are separated using condenser 83*a* has been described as an example, and a water vapor separation membrane may be used in place of condenser 83*a* to separate $CO_2$ and water vapor from each other. In this case, water vapor separated by the water vapor separation membrane may be fed as it is to mixer 81*a* without being liquefied.

Modification of Embodiment 1

A hydrogen production device 100*b* shown in FIG. 8(*b*) is a device for hydrogen production by performing steam reforming, and is different from that in the above embodiment in that $CH_4$ having a pressure higher than that of a steam reforming reaction is used as $CH_4$ as a raw material for steam reforming. In the present modification, by using $CH_4$ having a pressure higher than that in the above embodiment, electric power obtained by differential pressure power generation using $CH_4$ can be used for the operation of equipment provided in hydrogen production device 100*b*. Hereinafter, the same members as those described in the above-described embodiment are denoted by the same reference numerals, and description thereof is omitted.

Hydrogen production device 100*b* includes a mixer 81*a*, a water vapor reformer 82*a*, a gas separation device 20, a condenser 83*a*, a decompression pump 84*a*, a liquid draining pump 85*a*, an expansion turbine 86*b*, and a generator 87*b*. The description of each member other than expansion turbine 86*b* and generator 87*b* is as described above.

Expansion turbine 86*b* is driven by introducing $CH_4$ having a pressure higher than that of $CH_4$ when used in water vapor reformer 82*a*, and accordingly, the introduced $CH_4$ is expanded and decompressed. $CH_4$ decompressed by expansion turbine 86*b* is fed to mixer 81*a*. Generator 87*b* is driven by driving expansion turbine 86*b* to generate power. The electric power generated by generator 87*b* can be used to drive decompression pump 84*a* and liquid discharge pump 85*a*.

In hydrogen production device 100*b* shown in FIG. 8(*b*), hydrogen can be produced as follows. First, $CH_4$ as a raw material for steam reforming is introduced into expansion turbine 86*b*. In expansion turbine 86*b*, $CH_4$ is sprayed to a blade part, whereby expansion turbine 86*b* is rotated to drive generator 87*b*. As a result, generator 87*b* generates power. $CH_4$ expanded and decompressed by expansion turbine 86*b* is fed to mixer 81*a*. As in the above-described embodiment, water is not particularly limited as long as it is suitable as a raw material for steam reforming, and may be procured from a device other than hydrogen production device 100*b*. As shown in FIG. 8(*b*), water recovered in gas separation device 20 to be described later may be used. When only water recovered in gas separation device 20 is insufficient as a raw material for steam reforming, water recovered in gas separation device 20 and water procured as water of a shortage from a device other than hydrogen production device 100*b* may be fed to mixer 81*a*. $CH_4$ and water vapor mixed by mixer 81*a* are fed to water vapor reformer 82*a*, and the steam reforming reaction and the CO conversion reaction are performed as described in the above-described embodiment. Subsequently, the reformed gas generated in the water vapor reformer 82*a* and the source gas containing unreacted water vapor in the raw material are fed to gas separation device 20, and separated into the mixed gas containing $CO_2$ and water vapor and the source gas enriched with $H_2$ to obtain crude refined hydrogen ($H_2$ in the figure).

The composition (percentage of $CO_2$ and water vapor) of the permeate gas that permeates through acidic gas separation membrane sheet 10 provided in gas separation device 20 can be adjusted by adjusting the permeate-side pressure. $CO_2$ and water vapor that have selectively permeated through acidic gas separation membrane sheet 10 provided in gas separation device 20 are separated from each other by liquefying water vapor in condenser 83*a*. $CO_2$ and water are respectively recovered by decompression pump 84*a* and liquid draining pump 85*a* driven by electric power generated in generator 87*b*. The recovered water can be reused as a raw material for steam reforming.

In hydrogen production device 100*b* shown in FIG. 8(*b*), the case where decompression pump 84*a* and liquid draining pump 85*a* are driven by electric power obtained by generator 87*b* by differential pressure power generation has been described as an example without limitation. For example, power obtained by the rotation of expansion turbine 86*b* due to the introduction of $CH_4$ may be used to drive decompression pump 84*a* and liquid draining pump 85*a*.

In the present modification, when mixer 81*a* includes an ejector, $CH_4$ ($CH_4$ having a pressure higher than that of a steam reforming reaction) as a raw material for steam reforming may be used as a drive fluid for the ejector.

Embodiment 2

A hydrogen production device 100*c* shown in FIG. 9(*a*) is a device for hydrogen production by performing $CO_2$ reforming, and performs membrane separation according to a pressure reduction method. Hereinafter, the same members as those described in the above-described embodiment and modification are denoted by the same reference numerals, and description thereof is omitted. Hydrogen production device 100*c* includes a mixer 81*c*, a $CO_2$ reformer 82*c* for performing $CO_2$ reforming, a gas separation device 20 including a gas separation membrane module including an acidic gas separation membrane sheet 10, a condenser 83*a*, a decompression pump 84*a*, and a liquid draining pump 85*a*. The description of each member other than mixer 81*c* and $CO_2$ reformer 82*c* is as described above.

Mixer 81*c* is used for mixing $CH_4$ and $CO_2$ that are raw materials for $CO_2$ reforming. Examples of mixer 81*c* include a mixing device, an ejector, and a combination of two or more thereof.

CO₂ reformer 82c is used for performing CO₂ reforming using CH₄ and CO₂ fed from mixer 81c. CO₂ reformer 82c can include a reforming unit for reforming CH₄ into H₂ and CO by CO₂ reforming shown by the reaction formula (4):

$$CH_4 + CO_2 \leftrightarrow 2CO + 2H_2 \qquad (4)$$

In hydrogen production device 100c shown in FIG. 9(*a*), hydrogen can be produced as follows. First, CH₄ and CO₂ as raw materials for CO₂ reforming are fed to mixer 81c. CO₂ fed to mixer 81c is not particularly limited as long as it is suitable as a raw material for CO₂ reforming, and may be procured from a device other than hydrogen production device 100c. As shown in FIG. 9(*a*), CO₂ recovered in a gas separation device 20 to be described later can be used. When only CO₂ recovered in gas separation device 20 is insufficient as a raw material for CO₂ reforming, CO₂ recovered in gas separation device 20 and CO₂ procured from a device other than hydrogen production device 100c as a shortage of CO₂ may be fed to mixer 81c. CH₄ and CO₂ mixed in mixer 81c are fed to CO₂ reformer 82c, to perform a CO₂ reforming reaction shown by the reaction formula (4), thereby generating H₂ and CO as reformed gases. A CO₂ carrier contained in a hydrophilic resin composition layer 15 of acidic gas separation membrane sheet 10 used for gas separation device 20 requires water for a reversible reaction with CO₂, as shown by the formula (1), so that a source gas containing a reformed gas fed to the gas separation device and unreacted CO₂ in a raw material needs to be humidified in advance. As water used for humidifying the source gas, water recovered in gas separation device 20 to be described later can be used. Before the humidified source gas is fed to gas separation device 20, the humidified source gas is used to enrich CO₂ in a CO conversion reaction shown by the reaction formula (3), whereby a CO₂ removal efficiency in the gas separation device can be improved.

The reformed gas generated in CO₂ reformer 82c is fed to gas separation device 20 as a source gas further containing unreacted CO₂ in the raw material and water vapor added for preliminary humidification. Acidic gas separation membrane sheet 10 provided in gas separation device 20 can cause CO₂ and water vapor to selectively permeate therethrough, whereby the mixed gas containing CO₂ and water vapor and the source gas enriched with H₂ are separated from each other to obtain crude refined hydrogen (H₂ in the figure). The composition (percentage of CO₂ and water vapor) of the permeate gas that permeates through acidic gas separation membrane sheet 10 provided in gas separation device 20 can be adjusted by adjusting the permeate-side pressure. CO₂ and water vapor that have selectively permeated through acidic gas separation membrane sheet 10 provided in gas separation device 20 are separated from each other by liquefying water vapor in condenser 83a. CO₂ is recovered by decompression pump 84a, and water generated liquefying water vapor is recovered by liquid draining pump 85a. CO₂ recovered by decompression pump 84a can be reused as a raw material for CO₂ reforming. Water recovered by liquid draining pump 85a can be used for humidifying the reformed gas.

In hydrogen production device 100c shown in FIG. 9(*a*), the case where CO₂ and water vapor are separated from each other using condenser 83a has been described as an example, and a water vapor separation membrane is used in place of condenser 83a, to separate CO₂ and water vapor from each other. In this case, water vapor separated by the water vapor separation membrane may be used as it is for humidifying the reformed gas without being liquefied.

Modification of Embodiment 2

A hydrogen production device 100d shown in FIG. 9(*b*) is a device for hydrogen production by performing CO₂ reforming, and is different from that in the above embodiment in that CH₄ having a pressure higher than that of a CO₂ reforming reaction is used as CH₄ as a raw material for CO₂ reforming. In the present modification, by using CH₄ having a pressure higher than that in the above embodiment, electric power obtained by differential pressure power generation using CH₄ can be used for the operation of equipment provided in hydrogen production device 100d. Hereinafter, the same members as those described in the above-described embodiment and modification are denoted by the same reference numerals, and description thereof is omitted.

Hydrogen production device 100d includes a mixer 81c, a CO₂ reformer 82c, a gas separation device 20, a condenser 83a, a decompression pump 84a, a liquid draining pump 85a, an expansion turbine 86b, and a generator 87b. The description of each member is as described above.

In hydrogen production device 100d shown in FIG. 9(*b*), hydrogen can be produced as follows. First, by introducing CH₄ as a raw material for CO₂ reforming into expansion turbine 86b, expansion turbine 86b is rotated to drive generator 87b, thereby generating power as in the above-described modification. CH₄ expanded and decompressed by expansion turbine 86b is fed to mixer 81c and mixed with CO₂. CO₂ is not particularly limited as long as it is suitable as a raw material for CO₂ reforming as in the above-described embodiment, and may be procured from a device other than hydrogen production device 100d. As shown in FIG. 9(*b*), CO₂ recovered by gas separation device 20 to be described later may be used. When only CO₂ recovered in gas separation device 20 is insufficient as a raw material for CO₂ reforming, CO₂ recovered in gas separation device 20, and CO₂ procured as CO₂ of a shortage from a device other than hydrogen production device 100d may be fed to mixer 81c. CH₄ and CO₂ mixed in mixer 81c are fed to CO₂ reformer 82c, where the CO₂ reforming reaction takes place as described in the above embodiment. Subsequently, the reformed gas generated in CO₂ reformer 82c, the unreacted CO₂ in the raw material, and the source gas containing water vapor added for preliminary humidification are fed to gas separation device 20, and separated into a mixed gas containing CO₂ and water vapor and a source gas enriched with H₂ to obtain crude refined hydrogen (H₂ in the figure). The composition (percentage of CO₂ and water vapor) of the permeate gas that permeates through acidic gas separation membrane sheet 10 provided in gas separation device 20 can be adjusted by adjusting the permeate-side pressure. CO₂ and water vapor that have selectively permeated through acidic gas separation membrane sheet 10 provided in gas separation device 20 are separated from each other by liquefying water vapor in condenser 83a. CO₂ and water are respectively recovered by decompression pump 84a and liquid draining pump 85a driven by electric power generated in generator 87b. The recovered CO₂ can be reused as a raw material for CO₂ reforming, and water can be reused for humidifying the reformed gas as necessary.

In production device 100d shown in FIG. 9(*b*), as described in the above-described modification, power obtained by the rotation of expansion turbine 86b by introduction of CH₄ may be used to drive decompression pump 84a and liquid draining pump 85a. In the present modification, when mixer 81a includes an ejector, CH$_4$ (CH$_4$ having a pressure higher than that of a steam reforming reaction) as a raw material for CO$_2$ reforming may be used as a drive fluid for the ejector.

Embodiment 3

Figure 10A:
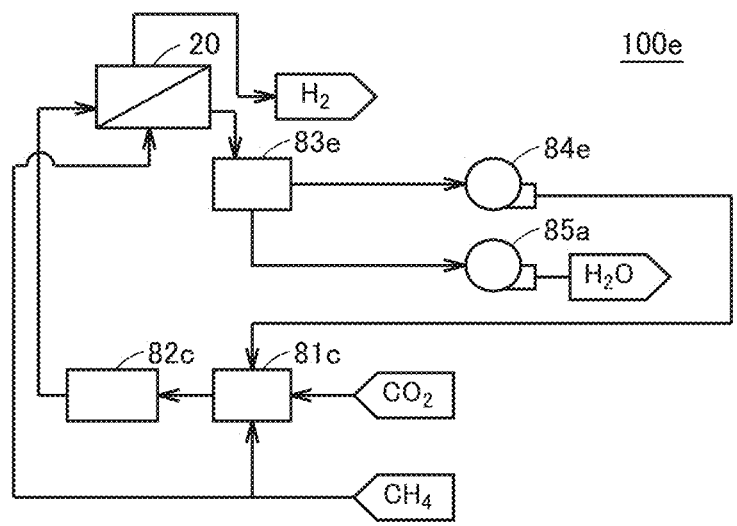
FIGS. 10($a$) and 10($b$) are configuration diagrams schematically showing still another example of a hydrogen production device using the separation membrane sheet of the present invention.

A hydrogen production device 100e shown in FIG. 10(a) is a device for hydrogen production by performing CO$_2$ reforming, and performs membrane separation according to a sweep method. As the sweep gas, CH$_4$ as a raw material for CO$_2$ reforming is used. Hereinafter, the same members as those described in the above-described embodiment and modification are denoted by the same reference numerals, and description thereof is omitted. Production device 100e includes a mixer 81c, a CO$_2$ reformer 82c for performing CO$_2$ reforming, a gas separation device 20 including a gas separation membrane module including an acidic gas separation membrane sheet 10, a condenser 83e, a blower 84e, and a liquid draining pump 85a. The description of each member other than condenser 83e and blower 84e is as described above.

Into condenser 83e, a mixed gas containing CO$_2$ and water vapor that have permeated through acidic gas separation membrane sheet 10 provided in gas separation device 20 and a sweep gas (CH$_4$) used in gas separation device 20 is introduced. Condenser 83e is used for cooling the mixed gas and separating water vapor and a gas containing CO$_2$ and CH$_4$. Blower 84e is used for feeding the sweep gas (CH$_4$) to gas separation device 20, and recovering the gas containing CO$_2$ and CH$_4$ separated by condenser 83e.

In hydrogen production device 100e shown in FIG. 10(a), hydrogen can be produced as follows. First, CH$_4$ and CO$_2$ as raw materials for CO$_2$ reforming are fed to mixer 81c. Into mixer 81c, the gas containing CO$_2$ and the sweep gas (CH$_4$) recovered in gas separation device 20 to be described later, as shown in FIG. 10(a) may be additionally fed in addition to CO$_2$ procured from a device other than hydrogen production device 100e. CH$_4$ and CO$_2$ mixed in mixer 81c are fed to CO$_2$ reformer 82c, where a CO$_2$ reforming reaction takes place as described in the above-described embodiment. Subsequently, the reformed gas generated in CO$_2$ reformer 82c, the unreacted CO$_2$ in the raw material, and the source gas containing water vapor added for preliminary humidification are fed to gas separation device 20, and CH$_4$ as a sweep gas is also fed to the permeate-side (permeate-side of acidic gas separation membrane sheet 10) of gas separation device 20. Gas separation device 20 separates the gas into the mixed gas containing CO$_2$, CH$_4$, and water vapor and the source gas enriched with H$_2$ to obtain crude refined hydrogen (H$_2$ in the figure). The composition (percentage of CO$_2$ and water vapor) of the permeate gas that permeates through acidic gas separation membrane sheet 10 provided in gas separation device 20 can be adjusted by adjusting the flow rate of the sweep gas.

CO$_2$ and water vapor that have selectively permeated through acidic gas separation membrane sheet 10 provided in gas separation device 20 are introduced into condenser 83e together with the sweep gas (CH$_4$). Water vapor is liquefied in condenser 83e, whereby the gas is separated into water vapor and the gas containing CO$_2$ and CH$_4$. The gas containing CO$_2$ and CH$_4$ is recovered by blower 84e, and water generated by the liquefaction of water vapor is recovered by liquid draining pump 85a. The gas containing CO$_2$ and CH$_4$ recovered by blower 84e can be reused as a raw material for CO$_2$ reforming. Water recovered by liquid draining pump 85a can be used for preliminary humidification of the reformed gas fed to gas separation device 20.

In hydrogen production device 100e shown in FIG. 10(a), the case where the gas containing CO$_2$ and CH$_4$, and water vapor are separated from each other using condenser 83e has been described as an example. The gas containing CO$_2$ and CH$_4$, and water vapor may be separated from each other using a water vapor separation membrane in place of condenser 83e. In this case, water vapor separated by the water vapor separation membrane may be used as it is for preliminary humidification of the reformed gas without being liquefied.

Modification of Embodiment 3

Figure 10B:
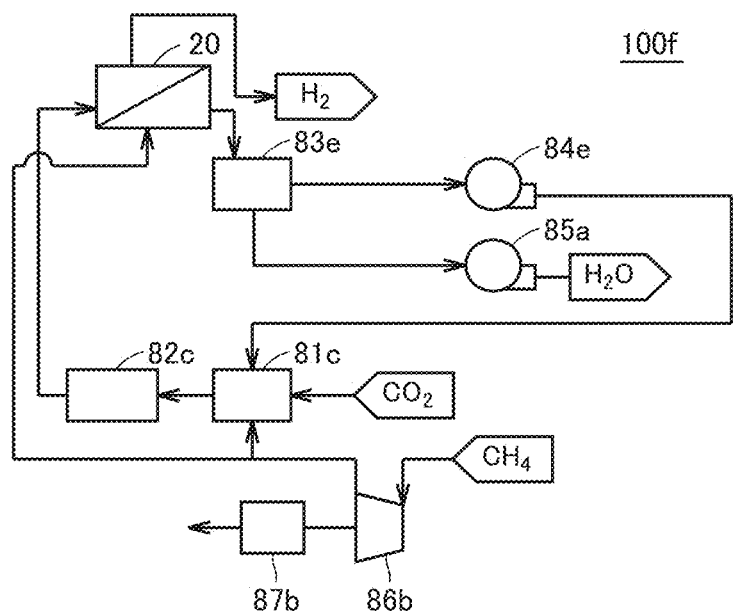

A hydrogen production device 100f shown in FIG. 10(b) is a device for hydrogen production by performing CO$_2$ reforming, and is different from that in the above embodiment in that CH$_4$ having a pressure higher than that of a CO$_2$ reforming reaction is used as CH$_4$ as a raw material for CO$_2$ reforming. In the present modification, by using CH$_4$ having a pressure higher than that in the above embodiment, electric power obtained by differential pressure power generation using CH$_4$ can be used for the operation of equipment provided in production device 100f. Hereinafter, the same members as those described in the above-described embodiment and modification are denoted by the same reference numerals, and description thereof is omitted.

Production device 100f includes a mixer 81c, a CO$_2$ reformer 82c, a gas separation device 20, a condenser 83e, a blower 84e, a liquid draining pump 85a, an expansion turbine 86b, and a generator 87b. The description of each member is as described above.

In hydrogen production device 100f shown in FIG. 10(b), hydrogen can be produced as follows. First, by introducing CH$_4$ as a raw material for CO$_2$ reforming into expansion turbine 86b, expansion turbine 86b is rotated to drive generator 87b, thereby generating power as in the above-described modification. CH$_4$ expanded and decompressed by expansion turbine 86b is fed to mixer 81c and mixed with CO$_2$. As in the above-described embodiment, a gas containing CO$_2$ and a sweep gas (CH$_4$) separated by gas separation device 20 and recovered by blower 84e from condenser 83e may be additionally fed to mixer 81c. CH$_4$ and CO$_2$ mixed in mixer 81c are fed to CO$_2$ reformer 82c, where a CO$_2$ reforming reaction takes place as described in the above-described embodiment.

Subsequently, the reformed gas generated in CO$_2$ reformer 82c, the unreacted CO$_2$ in the raw material, and the source gas containing water vapor added for preliminary humidification are fed to gas separation device 20, and CH$_4$ as a sweep gas is also fed to the permeate-side (permeate-side of acidic gas separation membrane sheet 10) of gas separation device 20. Gas separation device 20 separates the gas into the mixed gas containing CO$_2$, CH$_4$, and water vapor and the source gas enriched with H$_2$ to obtain crude refined hydrogen (H$_2$ in the figure). The composition (percentage of CO$_2$ and water vapor) of the permeate gas that permeates through acidic gas separation membrane sheet 10 provided in gas separation device 20 can be adjusted by adjusting the flow rate of the sweep gas.

CO$_2$ and water vapor that have selectively permeated through acidic gas separation membrane sheet 10 provided in gas separation device 20 are introduced into condenser 83e together with the sweep gas (CH$_4$) as described in the above-described embodiment. Water vapor is liquefied in condenser 83e, to separate the gas into water vapor and the gas containing $CO_2$ and $CH_4$. The gas containing $CO_2$ and $CH_4$, and water are respectively recovered by blower 84e and liquid draining pump 85a driven by electric power generated by generator 87b. The gas containing $CO_2$ and $CH_4$ recovered by blower 84e can be reused as a raw material for $CO_2$ reforming, and water recovered by liquid draining pump 85a can be used for preliminary humidification of the reformed gas fed to gas separation device 20.

In hydrogen production device 100f shown in FIG. 10(b), as described in the above-described modification, power obtained by the rotation of expansion turbine 86b by introduction of $CH_4$ may be used to drive blower 84e and liquid draining pump 85a. In the present modification, when mixer 81a includes an ejector, $CH_4$ ($CH_4$ having a pressure higher than that of a steam reforming reaction) as a raw material for $CO_2$ reforming may be used as a drive fluid for the ejector.

Embodiment 4

Figure 11A:
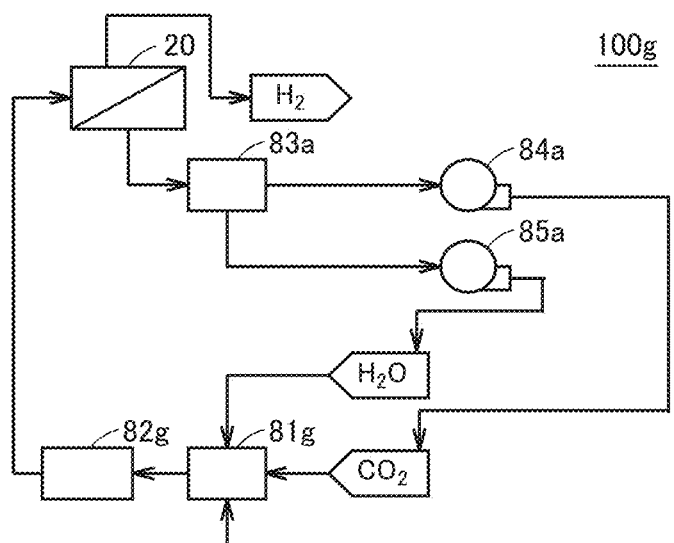
FIGS. 11($a$) and 11($b$) are configuration diagrams schematically showing yet still another example of a hydrogen production device using the separation membrane sheet of the present invention.

A hydrogen production device 100g shown in FIG. 11(a) is a device for hydrogen production by performing steam reforming and $CO_2$ reforming, and performs membrane separation according to a pressure reduction method. Hereinafter, the same members as those described in the above-described embodiment and modification are denoted by the same reference numerals, and description thereof is omitted.

Hydrogen production device 100g includes a mixer 81g, a reformer 82g for performing steam reforming and $CO_2$ reforming, a gas separation device 20 including a gas separation membrane module including an acidic gas separation membrane sheet 10, a condenser 83a, a decompression pump 84a, and a liquid draining pump 85a. The description of each member other than mixer 81g and reformer 82g is as described above.

Mixer 81g is used for feeding $CH_4$, water vapor, and $CO_2$ as raw materials for steam reforming and $CO_2$ reforming, to reformer 82g. Examples of mixer 81g include a mixing device, a vaporizer, a spray atomizer, an ejector, and a combination of two or more thereof.

Reformer 82g is used for performing steam reforming and $CO_2$ reforming using $CH_4$, water vapor, and $CO_2$ fed from mixer 81g. Reformer 82g can perform at least the steam reforming shown by the reaction formula (2) and the $CO_2$ reforming shown by the reaction formula (4), and may perform the CO conversion reaction shown by the reaction formula (3). Thereby, $CH_4$ can be reformed to $H_2$ and CO. Furthermore, CO can be converted to $CO_2$ and $H_2$.

In hydrogen production device 100g shown in FIG. 11(a), hydrogen can be produced as follows. First, $CH_4$, water vapor (or water), and $CO_2$ as raw materials for steam reforming and $CO_2$ reforming are fed to mixer 81g. Water vapor (or water) and $CO_2$ fed to mixer 81g are not particularly limited as long as they are suitable as raw materials for steam reforming and $CO_2$ reforming, and may be procured from a device other than hydrogen production device 100g. As shown in FIG. 11(a), water or $CO_2$ recovered in gas separation device 20 to be described later can be used. When only water and $CO_2$ recovered in gas separation device 20 are insufficient as raw materials for steam reforming and $CO_2$ reforming, water and $CO_2$ recovered in gas separation device 20, and water and $CO_2$ procured as water and $CO_2$ of shortage from a device other than production device 100g may be fed to mixer 81g. $CH_4$, water vapor, and $CO_2$ mixed by mixer 81g, where the steam reforming reaction (reaction formula (2)) and the $CO_2$ reforming reaction (reaction formula (4)) described above is performed, to generate $H_2$ and CO as reformed gases. Furthermore, when the CO conversion reaction (reaction formula (3)) is performed in reformer 82g, $CO_2$ is additionally generated.

The reformed gas generated in reformer 82g is fed to gas separation device 20. In addition to the reformed gas, a source gas containing water vapor (unreacted water vapor in a raw material) is introduced into gas separation device 20. Acidic gas separation membrane sheet 10 provided in gas separation device 20 can cause $CO_2$ and water vapor to selectively permeate therethrough, whereby the mixed gas containing $CO_2$ and water vapor and the source gas enriched with $H_2$ are separated from each other to obtain crude refined hydrogen ($H_2$ in the figure). The composition (percentage of $CO_2$ and water vapor) of the permeate gas that permeates through acidic gas separation membrane sheet 10 provided in gas separation device 20 can be adjusted by adjusting the permeate-side pressure. $CO_2$ and water vapor that have selectively permeated through acidic gas separation membrane sheet 10 provided in gas separation device 20 are separated from each other by liquefying water vapor in condenser 83a. $CO_2$ is recovered by decompression pump 84a, and water generated liquefying water vapor is recovered by liquid draining pump 85a. $CO_2$ recovered by decompression pump 84a can be reused as a raw material for $CO_2$ reforming. Water recovered by liquid draining pump 85a can be reused as a raw material for steam reforming.

In hydrogen production device 100g shown in FIG. 11(a), the case where $CO_2$ and water vapor are separated from each other using condenser 83a has been described as an example, and a water vapor separation membrane is used in place of condenser 83a, to separate $CO_2$ and water vapor from each other. In this case, water vapor separated by the water vapor separation membrane may be fed as it is to mixer 81a without being liquefied.

Modification of Embodiment 4

Figure 11B:
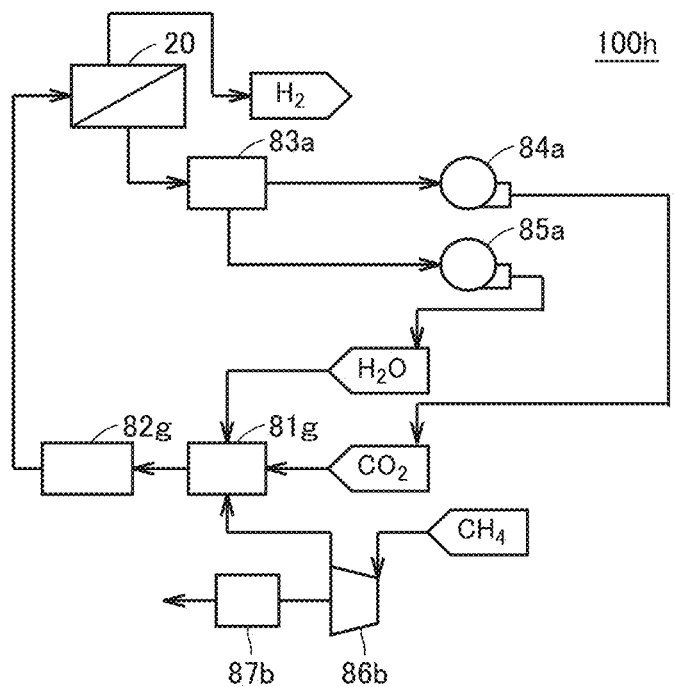

A hydrogen production device 100h shown in FIG. 11(b) is a device for hydrogen production by performing steam reforming and $CO_2$ reforming, and is different from that in the embodiment in that $CH_4$ having a pressure higher than that of a steam reforming reaction and $CO_2$ reforming reaction is used as $CH_4$ as a raw material for steam reforming and $CO_2$ reforming. In the present modification, by using $CH_4$ having a pressure higher than that in the above embodiment, electric power obtained by differential pressure power generation using $CH_4$ can be used for the operation of equipment provided in production device 100h. Hereinafter, the same members as those described in the above-described embodiment are denoted by the same reference numerals, and description thereof is omitted.

Production device 100h includes a mixer 81g, a reformer 82g, a gas separation device 20, a condenser 83a, a decompression pump 84a, a liquid draining pump 85a, an expansion turbine 86b, and a generator 87b. The description of each member is as described above.

In hydrogen production device 100h shown in FIG. 11(b), hydrogen can be produced as follows. First, by introducing $CH_4$ as a raw material for steam reforming into expansion turbine 86b, expansion turbine 86b is rotated to drive generator 87b, thereby causing generator 87b to generate power as in the above-described modification. $CH_4$ expanded and decompressed by expansion turbine 86b is fed to mixer 81g. $CH_4$, water vapor, and $CO_2$ mixed by mixer 81g are fed to reformer 82g, to perform a steam reforming reaction and a $CO_2$ reforming reaction as in the above-described embodiment, thereby generating $H_2$ and CO as reformed gases. Furthermore, when the CO conversion reaction (reaction formula (3)) is performed in reformer 82g, $CO_2$ is additionally generated.

Subsequently, the reformed gas generated in reformer 82g, and the source gas containing water vapor (unreacted water vapor in the raw material) are fed to gas separation device 20, and separated into a mixed gas containing $CO_2$ and water vapor and a source gas enriched with $H_2$ to obtain crude refined hydrogen ($H_2$ in the figure). The composition (percentage of $CO_2$ and water vapor) of the permeate gas that permeates through acidic gas separation membrane sheet 10 provided in gas separation device 20 can be adjusted by adjusting the permeate-side pressure. $CO_2$ and water vapor that have selectively permeated through acidic gas separation membrane sheet 10 provided in gas separation device 20 are separated from each other by liquefying water vapor in condenser 83a. $CO_2$ and water are respectively recovered by decompression pump 84a and liquid draining pump 85a driven by electric power generated in generator 87b. $CO_2$ recovered by decompression pump 84a can be reused as a raw material for $CO_2$ reforming, and water recovered by liquid draining pump 85a can be reused as a raw material for steam reforming.

In production device 100h shown in FIG. 11(b), as described in the above-described modification, power obtained by the rotation of expansion turbine 86b by introduction of $CH_4$ may be used to drive decompression pump 84a and liquid draining pump 85a. In the present modification, when mixer 81a includes an ejector, $CH_4$ ($CH_4$ having a pressure higher than that of a steam reforming reaction and $CO_2$ reforming reaction) as a raw material for steam reforming may be used as a drive fluid for the ejector.

Embodiment 5

Figure 12A:
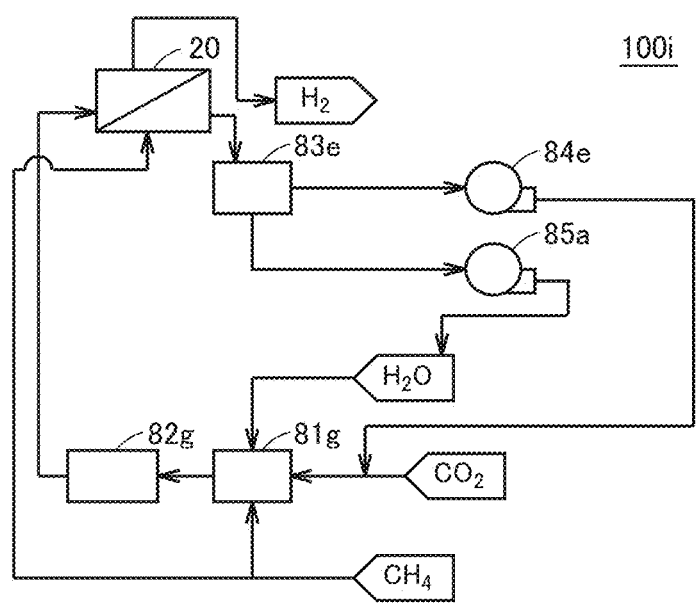
FIGS. 12($a$) and 12($b$) are configuration diagrams schematically showing further another example of a hydrogen production device using the separation membrane sheet of the present invention.

A hydrogen production device 100i shown in FIG. 12(a) is a device for hydrogen production by performing steam reforming and $CO_2$ reforming, and performs membrane separation according to a sweep method. Hereinafter, the same members as those described in the above-described embodiment and modification are denoted by the same reference numerals, and description thereof is omitted. Production device 100i includes a mixer 81g, a reformer 82g for performing steam reforming and $CO_2$ reforming, a gas separation device 20 including a gas separation membrane module including an acidic gas separation membrane sheet 10, a condenser 83e, a blower 84e, and a liquid draining pump 85a.

In hydrogen production device 100i shown in FIG. 12(a), hydrogen can be produced as follows. First, $CH_4$, water vapor (or water), and $CO_2$ as raw materials for steam reforming and $CO_2$ reforming are fed to mixer 81g. In addition to water and $CO_2$ procured from a device other than hydrogen production device 100i, as shown in FIG. 12(a), water, and a gas containing $CO_2$ and a sweep gas ($CH_4$) recovered in gas separation device 20 to be described later may be additionally fed to mixer 81g. $CH_4$, water vapor, and $CO_2$ adjusted by mixer 81g are fed to reformer 82g, to perform a steam reforming reaction and a $CO_2$ reforming reaction as described in the above-described embodiment, thereby generating $H_2$ and CO as reformed gases. Furthermore, when the CO conversion reaction (reaction formula (3)) is performed in reformer 82g, $CO_2$ is additionally generated. Subsequently, the reformed gas generated in reformer 82g, and the source gas containing water vapor (unreacted water vapor in the raw material) are fed to gas separation device 20, and $CH_4$ as a sweep gas is also fed to the permeate-side (the permeate-side of acidic gas separation membrane sheet 10) of gas separation device 20. Gas separation device 20 separates the gas into a mixed gas containing $CO_2$ and water vapor and a source gas enriched with $H_2$ to obtain crude refined hydrogen ($H_2$ in the figure). The composition (percentage of $CO_2$ and water vapor) of the permeate gas that permeates through acidic gas separation membrane sheet 10 provided in gas separation device 20 can be adjusted by adjusting the flow rate of the sweep gas.

$CO_2$ and water vapor that have selectively permeated through acidic gas separation membrane sheet 10 provided in gas separation device 20 are introduced into condenser 83e together with the sweep gas ($CH_4$) as described in the above-described embodiment. Water vapor is liquefied in condenser 83e, to separate the gas into water vapor and the gas containing $CO_2$ and $CH_4$. The gas containing $CO_2$ and $CH_4$ is recovered by blower 84e, and water generated by the liquefaction of water vapor is recovered by liquid draining pump 85a. The gas containing $CO_2$ and $CH_4$ recovered by blower 84e can be reused as a raw material for steam reforming and $CO_2$ reforming. Water recovered by liquid draining pump 85a can be reused as a raw material for steam reforming.

In hydrogen production device 100i shown in FIG. 12(a), the case where the gas containing $CO_2$ and $CH_4$, and water vapor are separated from each other using condenser 83e has been described as an example. The gas containing $CO_2$ and $CH_4$, and water vapor may be separated from each other using a water vapor separation membrane in place of condenser 83a. In this case, water vapor separated by the water vapor separation membrane may be fed as it is to mixer 81g without being liquefied.

Modification of Embodiment 5

Figure 12B:
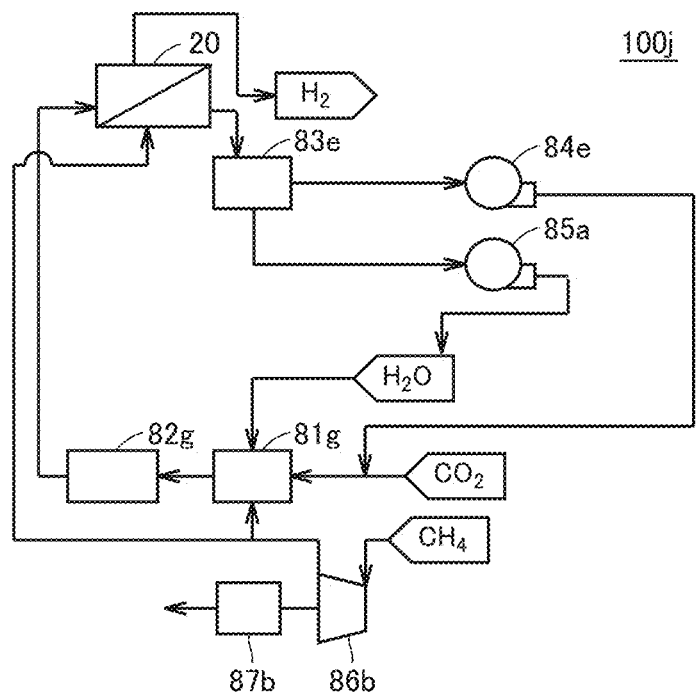

A hydrogen production device 100j shown in FIG. 12(b) is a device for hydrogen production by performing steam reforming and $CO_2$ reforming, and is different from that in the above embodiment in that $CH_4$ having a pressure higher than that of a steam reforming reaction and a $CO_2$ reforming reaction is used as $CH_4$ as a raw material for steam reforming and $CO_2$ reforming. In the present modification, by using $CH_4$ having a pressure higher than that in the above embodiment, electric power obtained by differential pressure power generation using $CH_4$ can be used for the operation of equipment provided in hydrogen production device 100j. Hereinafter, the same members as those described in the above-described embodiment and modification are denoted by the same reference numerals, and description thereof is omitted.

Production device 100j includes a mixer 81g, a reformer 82g, a gas separation device 20, a condenser 83e, a blower 84e, a liquid draining pump 85a, an expansion turbine 86b, and a generator 87b. The description of each member is as described above.

In hydrogen production device 100j shown in FIG. 12(b), hydrogen can be produced as follows. First, by introducing $CH_4$ as a raw material for steam reforming into expansion turbine 86b, expansion turbine 86b is rotated to drive generator 87b, thereby generating power as in the above-described modification. $CH_4$ expanded and decompressed by expansion turbine 86b is fed to mixer 81g. Water vapor (or water) and $CO_2$ fed to mixer 81g may be procured from a device other than hydrogen production device 100j as in the above embodiment, and as shown in FIG. 12(b), water, and a gas containing $CO_2$ and a sweep gas ($CH_4$) recovered in gas separation device 20 to be described later may be used. CH$_4$, water vapor, and CO$_2$ mixed by mixer 81g are fed to reformer 82g, where at least the steam reforming reaction and the CO$_2$ reforming reaction is performed as described in the above-described embodiment.

Subsequently, the reformed gas generated in reformer 82g, and the source gas containing water vapor (unreacted water vapor in the raw material) are fed to gas separation device 20, and CH$_4$ as a sweep gas is also fed to the permeate-side (permeate-side of acidic gas separation membrane sheet 10) of gas separation device 20. Gas separation device 20 separates the gas into the mixed gas containing CO$_2$, CH$_4$, and water vapor and the source gas enriched with H$_2$ to obtain crude refined hydrogen (H$_2$ in the figure). The composition (percentage of CO$_2$ and water vapor) of the permeate gas that permeates through acidic gas separation membrane sheet 10 provided in gas separation device 20 can be adjusted by adjusting the flow rate of the sweep gas. CO$_2$ and water vapor that have selectively permeated through acidic gas separation membrane sheet 10 provided in gas separation device 20 are introduced into condenser 83e together with the sweep gas (CH$_4$) as described in the above embodiment. Water vapor is liquefied in condenser 83e, whereby the gas is separated into water vapor and the gas containing CO$_2$ and CH$_4$. The gas containing CO$_2$ and CH$_4$ is recovered by blower 84e, and water generated by the liquefaction of water vapor is recovered by liquid draining pump 85a. The gas containing CO$_2$ and CH$_4$ recovered by blower 84e can be reused as a raw material for steam reforming and CO$_2$ reforming. Water recovered by liquid draining pump 85a can be reused as a raw material for steam reforming.

In production device 100j shown in FIG. 12(b), as described in the above-described modification, power obtained by the rotation of expansion turbine 86b by introduction of CH$_4$ may be used to drive decompression pump 84a and liquid draining pump 85a. In the present modification, when mixer 81a includes an ejector, CH$_4$ (CH$_4$ having a pressure higher than that of a steam reforming reaction) as a raw material for steam reforming may be used as a drive fluid for the ejector.

Embodiments 1 to 5 of the method for hydrogen production described above and modifications thereof can be used in a fuel cell system using, as a fuel, hydrogen contained in the reformed gas generated by the hydrocarbon reforming reaction.

EXAMPLES

Hereinafter, the present invention will be more specifically described with reference to Examples and Comparative Examples; however, the present invention is not intended to be limited thereto.

[Measurement of Filtration Residue Fraction]

A sample having a size of 5 cm×5 cm was cut out from an acidic gas separation membrane sheet. The sample was immersed in 50 mL of water at a temperature of 20° C., and a hydrophilic resin composition layer was sufficiently dispersed in water to obtain hydrophilic resin composition dispersed water. The obtained hydrophilic resin composition dispersed water was subjected to natural filtration without stirring and pressurizing, using a 60-mesh filter medium (trade name: nylon mesh NB60, material: nylon 66PA, wire diameter: 165 μm, mesh opening: 258 μm, manufactured by Tokyo Screen Co., Ltd.), to obtain a filtration residue and a filtrate after 5 minutes from the start of filtration. The obtained filtration residue and filtrate were vacuum-dried in a vacuum oven (manufactured by ASONE, trade name: vacuum dryer AVO-250N) for 24 hours at a temperature of 100° C., and the weights of the filtration residue and filtrate after vacuum drying were then respectively measured as the solid weight [g] of the filtration residue and the solid weight [g] of the filtrate. Based on the obtained solid weight, the formula (I):

Filtration residue fraction [%]={weight of solid content of filtration residue [g]/(weight of solid content of filtration residue [g]+weight of solid content of filtrate [g])}×100 (I), the filtration residue fraction was calculated.

[Measurement of Ion Exchange Capacity]

The ion exchange capacity of the hydrophilic resin contained in the hydrophilic resin composition layer was measured with respect to the filtration residue obtained when the filtration residue fraction was measured. Specifically, the ion exchange capacity of the hydrophilic resin was measured by the following procedure. 35 mg of the filtration residue obtained when the filtration residue fraction was measured was dispersed in 180 mL of purified water, and 20 mL of the dispersion liquid was collected. While the dispersion liquid was stirred with a stirrer, 0.1 M hydrochloric acid was added to the dispersion liquid to set the pH of the dispersion liquid to about 3.5, followed by neutralization titration using an 0.2 M aqueous sodium hydroxide solution. From the results of the neutralization titration, the ion exchange capacity of the hydrophilic resin was calculated using the following formula:

Ion exchange capacity [millimole equivalent/dry resin 1 g in filtration residue]=(sodium hydroxide titer [mL]×concentration of sodium hydroxide [0.2 millimole/mL]/dry washing filtration residue [35 mg])×1000.

Here, sodium hydroxide titer [mL]=amount of sodium hydroxide dropped to second neutralization point [mL]—amount of sodium hydroxide dropped to first neutralization point [mL] is set.

[Life Performance Test]

Figure 7:
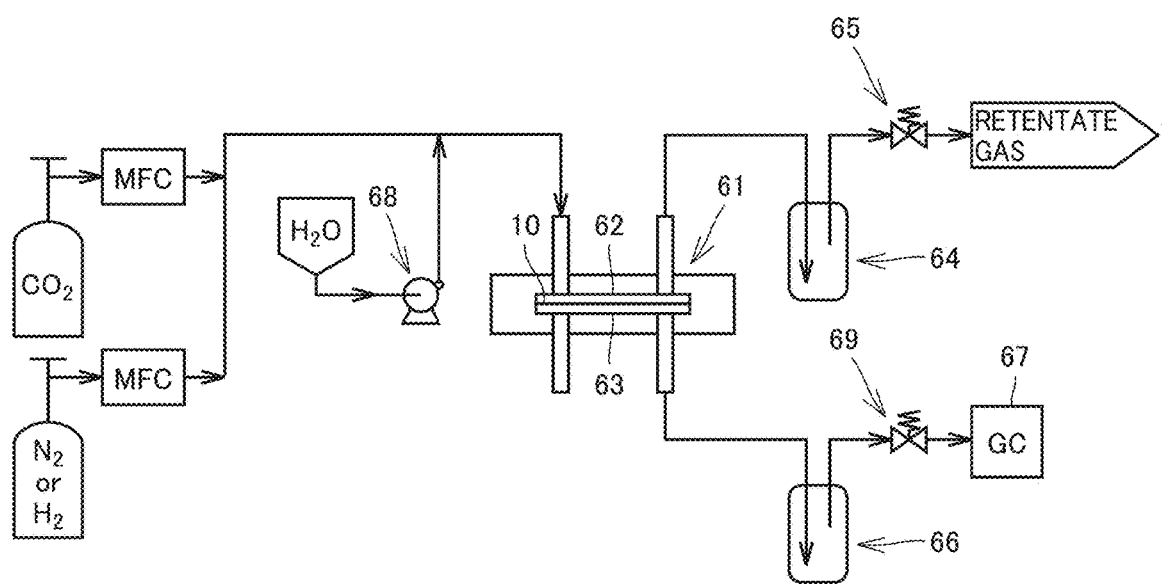
FIG. 7 is a schematic view of a gas separation device used in Examples.

The CO$_2$ permeance and N$_2$ permeance of an acidic gas separation membrane sheet 10 were measured using a gas separation device including a gas separation membrane cell 61 shown in FIG. 7. Specifically, produced acidic gas separation membrane sheet 10 was cut into a piece of an appropriate size to form a flat membrane. This was fixed between a feed-side chamber 62 and a permeate-side chamber 63 of the stainless steel gas separation membrane cell 61. Source gases (CO$_2$: 34.4%, N$_2$: 27.8%, H$_2$O: 37.8%) were fed to feed-side chamber 62 of gas separation membrane cell 61 at a flow rate of 1349.5 NmL/min. Here, water was sent by a metered liquid feed pump 68, heated and evaporated to adjust H$_2$O to the above mixing ratio. The pressure of the feed-side chamber 62 was adjusted to 900 kPaA (absolute pressure) by a back pressure regulator 65 provided on the downstream side of a cooling trap 64 in the middle of a retentate gas discharge path. A back pressure regulator 69 was also provided between a cooling trap 66 and a gas chromatograph 67, thereby adjusting the pressure of permeate-side chamber 63 to atmospheric pressure.

When the steady state was reached after the start of operation, the permeate gas after water vapor contained in the permeate gas discharged from permeate side chamber 63 was removed by cooling trap 66 was analyzed by gas chromatograph 67. The permeance of CO$_2$ (mol/(m$^2$·s·kPa)) and the permeance of N$_2$ (mol/(m$^2$·s·kPa)) were calculated as initial CO$_2$ permeance and initial N$_2$ permeance.

When 146 hours have passed since reaching a steady state after the start of operation, the permeate gas after water vapor contained in the permeate gas discharged from permeate-side chamber 63 was removed by cooling trap 66 was analyzed by gas chromatograph 67. $CO_2$ permeance (mol/($m^2$ s kPa)) and $N_2$ permeance (mol/($m^2$ s kPa)) were calculated as $CO_2$ permeance after 146 hours and $N_2$ permeance after 146 hours. Using the calculated values, the life performance of $CO_2$ permeance and the life performance of $CO_2/N_2$ selectivity were calculated according to the following calculating formula.

Life performance of $CO_2$ permeance=$CO_2$ permeance after 146 hr [mol/($m^2 \cdot s \cdot kPa$)]/Initial $CO_2$ permeance [mol/($m^2 \cdot s \cdot kPa$)]

Life performance of $CO_2/N_2$ selectivity=$CO_2/N_2$ selectivity after 146 hr/initial $CO_2/N_2$ selectivity Here, the initial $CO_2/N_2$ selectivity and the $CO_2/N_2$ selectivity after 146 hr were calculated according to the following calculating formula.

Initial $CO_2/N_2$ selectivity=Initial $CO_2$ permeance [mol/($m^2 \cdot s \cdot kPa$)]/Initial $N_2$ permeance [mol/($m^2 \cdot s \cdot kPa$)]

$CO_2/N_2$ selectivity after 146 hr=$CO_2$ permeance after 146 hr [mol/($m^2 \cdot s \cdot kPa$)]/$N_2$ permeance after 146 hr [mol/($m^2 \cdot s \cdot kPa$)]

Example 1

170.92 parts by mass of water as a medium, 4 parts by mass of crosslinked polyacrylic acid (manufactured by SUMITOMO SEIKA CHEMICALS CO., LTD.; trade name: AQUPEC "HV-501", ion exchange capacity: 13.5 millimole equivalent/g) and 0.8 parts by mass of non-crosslinked polyacrylic acid (manufactured by Sumitomo Seika Co., Ltd.: trade name: AQUPAANA "AP-40F (40% Na Saponified, ion exchange capacity: 12.4 millimole equivalent/g)" as polymers were charged into a raw material tank 31 to obtain a dispersion liquid in which the polymers were dispersed in water. After 38.09 parts by weight of a 50% aqueous solution of cesium hydroxide as an acidic gas carrier was added to the dispersion liquid, followed by mixing, 3.18 parts by weight of a 10% aqueous sodium tellurite solution and 1.2 parts by mass of a 10% surfactant (manufactured by AGC Seimi Chemical Co., Ltd.; trade name: Surflon "S-242") aqueous solution were added as additives, followed by mixing to obtain an application liquid. The obtained application liquid was defoamed using a defoaming device (manufactured by THINKY; trade name: "rotation and revolution mixer AWA-TORI-RENTARO ARE-310").

As a first porous layer 11, a hydrophobic porous PTFE membrane (manufactured by Sumitomo Electric Fine Polymer Inc.; trade name: POREFLON "HP-010-50") was used, and the application liquid obtained above was applied to one surface of first porous layer 11 at a temperature of 20 to 25° C. The first porous layer 11 to which the application liquid was applied was dried in a thermostatic bath at a temperature of about 100° C. for about 10 minutes to form a liquid layer.

Subsequently, the same hydrophobic porous PTFE membrane as that used for first porous layer 11 was used as a second porous layer 12, and second porous layer 12 was laminated on an opposite side of the liquid layer from first porous layer 11, to obtain a laminated body 18. The liquid layer of laminated body 18 was dried in a thermostatic bath at a temperature of 120° C. for about 7 minutes to form an application layer. The laminated body 18 after drying is placed on a metal tray. By an electron beam irradiation device 59 (manufactured by ESI, trade name: EC300/165/800), the application layer was irradiated with an electron beam having an acceleration voltage of 150 keV and an irradiation amount of 20 kGy from the second porous layer side of laminated body 18 to obtain a hydrophilic resin composition layer 15, thereby obtaining an acidic gas separation membrane sheet 10. Using the obtained acidic gas separation membrane sheet 10, a filtration residue fraction and an ion exchange capacity were measured, and a life performance test was performed. The results are shown in Table 1.

Example 2

An acidic gas separation membrane sheet 10 was obtained in the same manner as in Example 1 except that crosslinked polyacrylic acid used in an application liquid was changed to SUMITOMO SEIKA CHEMICALS CO., LTD.; trade name: ACPEC "HV-501E". Using the obtained acidic gas separation membrane sheet 10, a filtration residue fraction and an ion exchange capacity were measured, and a life performance test was performed. The results are shown in Table 1.

Example 3

An acidic gas separation membrane sheet 10 was obtained in the same manner as in Example 1 except that the acceleration voltage and dose of electron beam irradiation were changed as shown in Table 1. Using the obtained acidic gas separation membrane sheet 10, a filtration residue fraction and an ion exchange capacity were measured, and a life performance test was performed. The results are shown in Table 1.

Example 4

An acidic gas separation membrane sheet 10 was obtained in the same manner as in Example 1 except that the addition amounts of crosslinked polyacrylic acid, non-crosslinked polyacrylic acid, and a 50% aqueous cesium hydroxide solution used in an application liquid were changed as shown in Table 1. Using the obtained acidic gas separation membrane sheet 10, a filtration residue fraction and an ion exchange capacity were measured, and a life performance test was performed. The results are shown in Table 1.

Comparative Example 1

An acidic gas separation membrane sheet 10 was obtained in the same manner as in Example 2 except that electron beam irradiation by an electron beam irradiation device 59 was not performed. Using the obtained acidic gas separation membrane sheet 10, a filtration residue fraction and an ion exchange capacity were measured, and a life performance test was performed. The results are shown in Table 1.

Comparative Example 2

An acidic gas separation membrane sheet 10 was obtained in the same manner as in Example 1 except that an electron beam irradiation amount was changed as shown in Table 1. Using the obtained acidic gas separation membrane sheet 10, a filtration residue fraction and an ion exchange capacity were measured, and a life performance test was performed. The results are shown in Table 1. "Unmeasurable (damaged)" in the column of life performance in Table 2 indicates that first porous layer 11 of acidic gas separation membrane sheet 10 is damaged and the life performance test cannot be performed.

Comparative Example 3

An acidic gas separation membrane sheet 10 was obtained in the same manner as in Example 4 except that electron beam irradiation by an electron beam irradiation device 59 was not performed. Using the obtained acidic gas separation membrane sheet 10, a filtration residue fraction and an ion exchange capacity were measured, and a life performance test was performed. The results are shown in Table 1.

In any of Examples 1 to 4, the ion exchange capacity is greater than or equal to 1 millimole equivalent. In Comparative Examples 1 and 2, the amount of the hydrophilic resin contained in the filtration residue was extremely small, so that the ion exchange capacity was less than the detection lower limit. In Comparative Example 3, the filtration residue fraction was 0%, so that the ion exchange capacity could not be measured.

TABLE 1

| | electron beam | | application liquid | | | hydrophilic resin composition layer | | life performance | |
|---|---|---|---|---|---|---|---|---|---|
| | dose [kGy] | voltage [keV] | non-crosslinked polyacrylic acid [parts by weight] | 50% crosslinked polyacrylic acid [parts by weight] | cesium hydroxide [parts by weight] | filtration residue fraction [%] | ion exchange capacity of filtration residue [millimol equivalent] | life performance of $CO_2$ permeance | $CO_2/N_2$ selectivity after 146 hr |
| Example 1 | 20 | 150 | 4.0 | 0.80 | 38.09 | 46 | 1.04 | 0.7 | 380 |
| Example 2 | 20 | 150 | 4.0 | 0.80 | 38.09 | 45 | 1.21 | 0.5 | 240 |
| Example 3 | 500 | 150 | 4.0 | 0.80 | 38.09 | 52 | 1.04 | 0.7 | 397 |
| Example 4 | 20 | 150 | 0.48 | 4.3 | 29.66 | 31 | 1.68 | 0.8 | 306 |
| Comparative Example 1 | — | — | 4.0 | 0.80 | 38.09 | 12 | less than detection lower limit | 0.7 | 44 |
| Comparative Example 2 | 1000 | 150 | 4.0 | 0.80 | 38.09 | 15 | less than detection lower limit | unmeasureable (damaged) | |
| Comparative Example 3 | — | — | 0.48 | 4.3 | 29.66 | 0 | unmeasureable | 1.4 | 2 |

REFERENCE SIGNS LIST

1: gas separation membrane element (separation membrane element), 3: feed-side flow path member, 4: permeate-side flow path member, 5: central tube, 10: acidic gas separation membrane sheet (separation membrane sheet), 11: first porous layer, 1l a: first porous layer rolled body, 12: second porous layer, 12a: second porous layer rolled body, 15: hydrophilic resin composition layer (resin composition layer), 18: laminated body, 18a: laminate-body rolled body, 20: gas separation device (separation device), 31: raw material tank, 32: stirring tank, 33: filter, 34: defoaming tank, 35: pipe, 37: application liquid tank, 38: slot die, 39: drying furnace, 49: additional drying furnace, 50: hole, 51: feed-side end part, 52: discharge port, 53: discharge-side end part, 55: anti-telescope device 59: electron beam irradiation device, 61: gas separation membrane cell, 62: feed-side chamber, 63: permeate-side chamber, 64: cooling trap, 65: back pressure regulator, 66: cooling trap, 67: gas chromatograph, 68: metered liquid feed pump, 69: back pressure regulator, 70: metered solution sending pump, 81a: mixer, 81c: mixer, 81g: mixer, 82a: water vapor reformer, 82c: carbon dioxide ($CO_2$) reformer, 82g: reformer, 83a: condenser, 83e: condenser, 84a: decompression pump, 84e: blower, 85a: liquid drain pump, 86b: expansion turbine, 87b: generator, 100a to 100j: hydrogen production device

The invention claimed is:

1. A separation membrane sheet that causes an acidic gas component to selectively permeate therethrough, the separation membrane sheet comprising:
   a first porous layer; and
   a resin composition layer formed on the first porous layer, wherein:
   the resin composition layer has a filtration residue fraction of greater than or equal to 20% and less than or equal to 90%; and
   contains a resin having an ionic group or a salt thereof, and has an ion exchange capacity of greater than or equal to 1 millimole equivalent per 1 g of a dry resin in a filtration residue.

2. The separation membrane sheet according to claim 1, further comprising a second porous layer.

3. The separation membrane sheet according to claim 2, wherein the second porous layer is laminated on an opposite side of the resin composition layer from the first porous layer.

4. The separation membrane sheet according to claim 1, wherein the ionic group is an ionic group exhibiting acidity.

5. The separation membrane sheet according to claim 4, wherein the ionic group exhibiting acidity is a carboxyl group.

6. The separation membrane sheet according to claim 1, wherein the resin composition layer further contains a substance that reversibly reacts with an acidic gas.

7. The separation membrane element comprising the separation membrane sheet according to claim 1.

8. A separation membrane element, comprising:
   a perforated central tube; and
   an element-use laminated body including the separation membrane sheet according to claim 1,
   wherein the element-use laminated body is wound around the perforated central tube.

9. A separation membrane module comprising:
   at least one separation membrane element according to claim 7;
   a source fluid feeding port for feeding a source fluid to the separation membrane sheet;
   a retentate fluid discharge port for discharging a source fluid that has not permeated through the separation membrane sheet; and a permeate fluid discharge port for discharging the acidic gas that has permeated through the separation membrane sheet.

10. The separation device comprising at least one separation membrane module according to claim 9.

11. A hydrogen production device comprising at least one separation membrane module according to claim 9, wherein:
the source fluid is a source gas containing hydrogen and carbon dioxide; and
the acidic gas contains carbon dioxide.

12. A manufacturing method for a separation membrane sheet that causes an acidic gas to selectively permeate therethrough,
the method comprising forming a resin composition layer on a first porous layer,
wherein the forming the resin composition layer comprises irradiating an application layer formed on the first porous layer with an electron beam having an irradiation amount of greater than or equal to 10 kGy and less than 1000 kGy; and
the resin composition layer has a filtration residue fraction of greater than or equal to 20% and less than or equal to 90%, and
the resin composition layer comprises a resin having an ionic group or a salt thereof, and an ionic exchange capacity of greater than or equal to 1 millimole equivalent per 1 g of a dry resin in a filtration residue.

13. The method of claim 12,
wherein:
the forming the resin composition layer further comprises obtaining a laminated body by laminating a second porous layer on an opposite side of the application layer from the first porous layer; and
irradiating the application layer with the electron beam is a process of irradiating the application layer of the laminated body with an electron beam.

14. The method of claim 12, wherein the ionic group is an ionic group exhibiting acidity.

15. The method of claim 14, wherein the ionic group exhibiting acidity is a carboxyl group.

16. The method of claim 12, wherein the application layer contains a non-crosslinked polymer.

17. The method of claim 16, wherein the application layer further contains a crosslinked polymer.

18. The method of claim 12, wherein acidic gas is carbon dioxide and the application layer further comprises at least one compound selected from the group consisting of alkali metal carbonates, alkali metal bicarbonates, alkanolamine, and alkali metal hydroxides.

19. The method of claim 12,
wherein the irradiation amount of the electron beam with which the application layer is irradiated is adjusted by at least one of the number of irradiations and irradiation time of the electron beam.

20. The method of claim 12, wherein the acidic gas is sulfur oxide and the application layer further comprises at least one compound selected from the group consisting of sulfur-containing compounds, citrates of alkali metals, and transition metal complexes.

21. The method of claim 12, wherein the acidic gas is nitrogen oxide and the application layer further comprises at least one compound selected from the group consisting of alkali metal nitrites and transition metal complexes.

* * * * *